(12) United States Patent
Alabbasi et al.

(10) Patent No.: US 12,328,736 B2
(45) Date of Patent: Jun. 10, 2025

(54) TRANSMISSION SCHEDULING IN A WIRELESS COMMUNICATION NETWORK

(71) Applicant: Telefonaktiebolaget LM Ericsson (publ), Stockholm (SE)

(72) Inventors: Abdulrahman Alabbasi, Kista (SE); Kittipong Kittichokechai, Järfälla (SE); Yufei Blankenship, Kildeer, IL (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 399 days.

(21) Appl. No.: 17/774,661

(22) PCT Filed: Nov. 7, 2020

(86) PCT No.: PCT/SE2020/051076
§ 371 (c)(1),
(2) Date: May 5, 2022

(87) PCT Pub. No.: WO2021/091475
PCT Pub. Date: May 14, 2021

(65) Prior Publication Data
US 2022/0394753 A1 Dec. 8, 2022

Related U.S. Application Data

(60) Provisional application No. 62/932,483, filed on Nov. 7, 2019.

(51) Int. Cl.
*H04W 72/23* (2023.01)
*H04W 72/02* (2009.01)
*H04W 72/566* (2023.01)

(52) U.S. Cl.
CPC ........... *H04W 72/23* (2023.01); *H04W 72/02* (2013.01); *H04W 72/569* (2023.01)

(58) Field of Classification Search
None
See application file for complete search history.

(56) References Cited

U.S. PATENT DOCUMENTS

2019/0253978 A1 8/2019 Pelletier et al.
2020/0305186 A1* 9/2020 Alfarhan ........... H04W 72/0453
(Continued)

FOREIGN PATENT DOCUMENTS

CN 107113858 A 8/2017
CN 110249674 A 9/2019
(Continued)

OTHER PUBLICATIONS

Institute for Information Industry, "Discussion on Configured Grant Enhancements", 3GPP TSG RAN WG1 #96, R1-1902931, Athens, Greece, Feb. 25-Mar. 1, 2019, 1-7.
(Continued)

*Primary Examiner* — Diane L Lo
(74) *Attorney, Agent, or Firm* — Murphy, Bilak & Homiller, PLLC

(57) ABSTRACT

A method performed by a wireless device comprises receiving (700) a first grant that allocates first radio resources for use by the wireless device and a second grant that allocates second radio resources for use by the wireless device, where the first radio resources partially overlap in time with the second radio resources. The method further comprises splitting (710) the first grant into a first non-overlapping grant and a first overlapping grant, where the first non-overlapping grant allocates a portion of the first radio resources which do not overlap in time with the second radio resources and the first overlapping grant allocates another portion of the first radio resources which overlap in time with the second radio resources.

20 Claims, 20 Drawing Sheets

(56) References Cited

U.S. PATENT DOCUMENTS

2020/0322972 A1* 10/2020 Hosseini ............... H04W 72/23
2021/0160917 A1* 5/2021 Goto ................. H04W 72/0446

FOREIGN PATENT DOCUMENTS

| JP | 2017506440 A | 3/2017 |
|---|---|---|
| WO | 2018182383 A1 | 10/2018 |
| WO | 2019136713 A1 | 7/2019 |
| WO | 2019180886 A1 | 9/2019 |

OTHER PUBLICATIONS

3GPP, "3rd Generation Partnership Project; Technical Specification Group Radio Access Network; NR; NR and NG-RAN Overall Description; Stage 2 (Release 15)", 3GPP TS 38.300 V15.2.0, Jun. 2018, 1-87.

Catt, "Data/data prioritization", 3GPP TSG-RAN WG2 Meeting #107bis, R2-1912211, Chongqing, P. R. China, Oct. 14-18, 2019, 1-5.

Ericsson, "Main functions of intra-UE data-data prioritization", 3GPP TSG-RAN WG2 #108, Tdoc R2-19xxxxx, Revision of R2-1912555, Reno, Nevada, US, Nov. 18-22, 2019, 1-7.

Nokia, et al., "On resource conflicts between UL grants and HARQ-ACK Enhancements for SPS", 3GPP TSG RAN WG1 Meeting #98, R1-1908439, Prague, CZ, Aug. 26-30, 2019, 1-9.

Nokia, et al., "Revised SID: Study on NR Industrial Internet of Things (IoT)", 3GPP TSG RAN meeting #81, RP-182090, Gold Coast, Australia, Sep. 10-13, 2018, 1-5.

Spreadtrum Communications, "Discussion on CG and CG collision of equal priority", 3GPP TSG-RAN WG2 Meeting #107bis, R2-1912247, Chongqing, China, Oct. 14-18, 2019, 1-3.

* cited by examiner

TRANSMISSION SCHEDULING IN A WIRELESS COMMUNICATION NETWORK

TECHNICAL FIELD

The present application relates generally to a wireless communication network and relates more particularly to transmission scheduling in such a network.

BACKGROUND

Dynamic scheduling in a wireless communication network requires the network to signal a dynamic uplink grant to a wireless device for each transmission occasion (also referred to as transmit time interval, or TTI) in which the wireless device is to transmit a transport block. This contributes signaling overhead, especially for service or traffic types that trigger recurring or periodic transport blocks, such as Voice-over-IP (VoIP). This signaling overhead may be reduced by configuring an uplink grant (e.g., semi-statically) to periodically recur for a wireless device, without the wireless device having to receive any dynamic control signaling to accomplish that recurrence. Such an uplink grant is referred to as a configured grant.

In some contexts, such as in an industrial Internet-of-Things (IIoT) scenario, a wireless device may need to handle communication for multiple service types, which may have different quality of service requirements and thereby dictate different priorities for their traffic. This may lead to a traffic mix that the wireless device must multiplex for uplink transmissions, e.g., on multiple logical channels using different configured grants. Handling this multiplexing, however, proves challenging when high-priority traffic for a later-starting grant arrives only after a decision has already been made to start transmitting lower-priority traffic using an earlier-starting grant.

SUMMARY

Some embodiments herein split an earlier-starting one of two received grants into two grants, one that overlaps the later-starting grant and one that does not, to proactively or reactively allow for later arrival of higher priority traffic. Alternatively or additionally, some embodiments herein allow a wireless device's physical layer to perform preemption on a repetition by repetition basis, so that higher-priority traffic may selectively puncture some repetitions of lower-priority traffic while still allowing transmission of other repetitions of the lower-priority traffic.

More particularly, embodiments herein include methods performed by a wireless device, including a method that comprises receiving a first grant that allocates first radio resources for use by the wireless device and a second grant that allocates second radio resources for use by the wireless device, where the first radio resources partially overlap in time with the second radio resources. This method further comprises splitting the first grant into a first non-overlapping grant and a first overlapping grant, where the first non-overlapping grant allocates a portion of the first radio resources which do not overlap in time with the second radio resources and the first overlapping grant allocates another portion of the first radio resources which overlap in time with the second radio resources.

Embodiments of the techniques described herein further comprise methods performed by a radio network node, including a method that comprises splitting a first grant that allocates first radio resources for use by a wireless device into a first non-overlapping grant that allocates a portion of the first radio resources which do not overlap in time with second radio resources allocated by a second grant for use by the wireless device and a first overlapping grant that allocates another portion of the first radio resources which overlap in time with the second radio resources. This method further comprises receiving uplink transmission from the wireless device based on said splitting.

Other embodiments described herein include another method performed by a wireless device, this method comprising receiving, at a physical layer of the wireless device, repetitions of a first channel transmission that are to be transmitted on first radio resources and receiving, at the physical layer, a second channel transmission that is to be transmitted on second radio resources that at least partly overlap in time with the first radio resources. This method further comprises dropping one or more repetitions of the first channel transmission that are to be transmitted on a portion of the first radio resources that overlap in time with the second radio resources. The method still further comprises transmitting one or more repetitions of the first channel transmission that are to be transmitted on a different portion of the first radio resources that do not overlap in time with the second radio resources and transmitting the second channel transmission on the second radio resources.

Apparatuses, computer programs, and computer-readable media corresponding to the above-summarized methods and variants thereof are also described in detail herein.

BRIEF DESCRIPTION OF THE DRAWINGS

FIG. 9 illustrates another example method carried out by a radio network node, according to some embodiments.

FIG. 10 illustrates another example method carried out by a wireless device, according to some embodiments.

DETAILED DESCRIPTION

Figure 1:
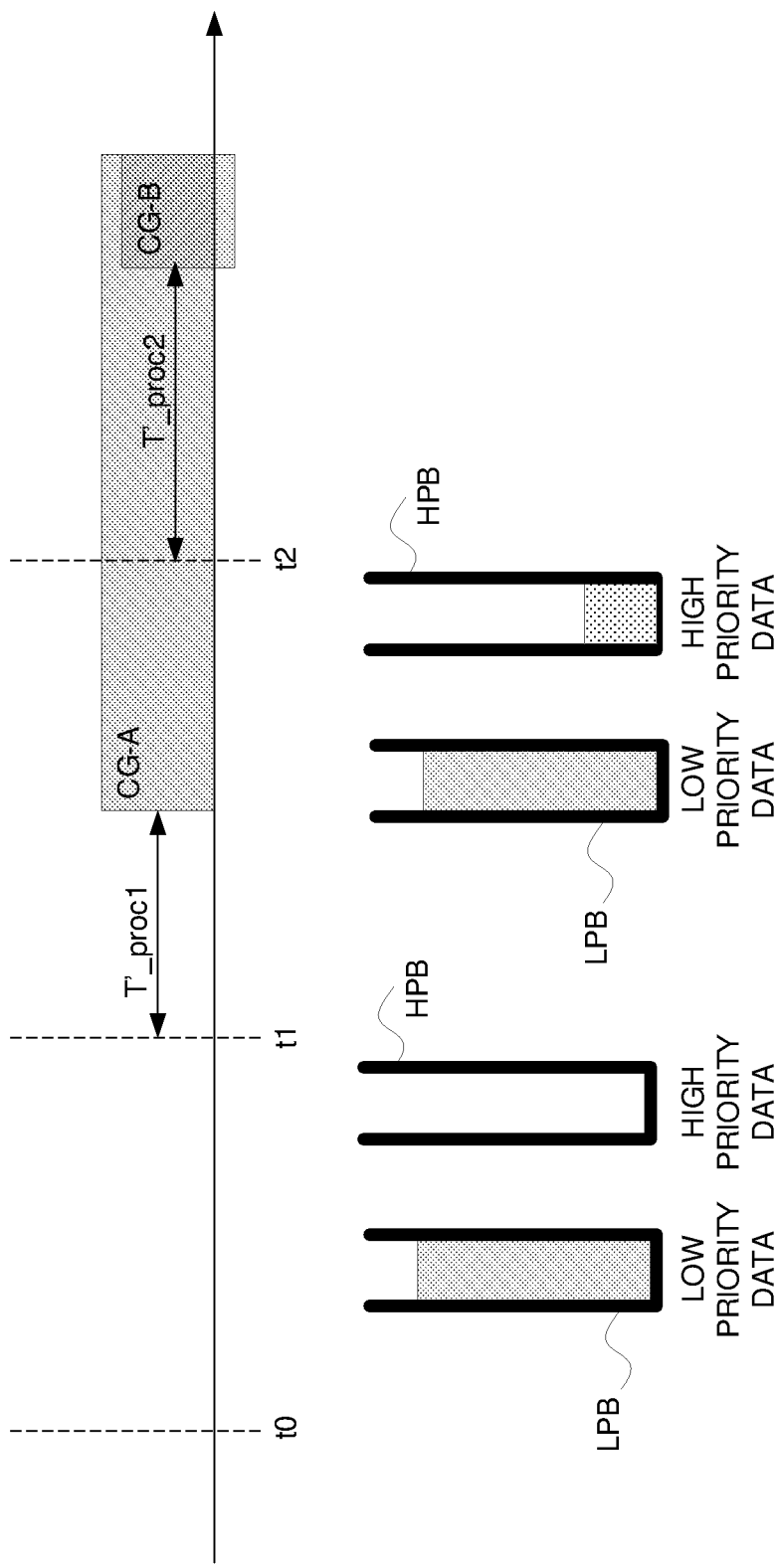
FIG. 1 illustrates a challenge arising with configured grants.

Some of the techniques and apparatuses detailed below are described within the context of 3GPP NR radio technology (3GPP TS 38.300 V15.2.0 (2018-06)). More particularly, some embodiments herein target New Radio (NR) technology enhancements with the aim of providing more deterministic low-latency delivery of data, e.g., as described in 3GPP study item RP-182090, Revised SID: Study on NR Industrial Internet of Things (IoT). This traffic is also referred to as time sensitive networking (TSN) traffic with typically periodic packet occurrences per cycle time.

It is understood, however, that the problems and solutions described herein are equally applicable to wireless access networks and user equipments (UEs) implementing other access technologies and standards. NR is used as an example technology where some embodiments are suitable and using NR in the description therefore is particularly useful for understanding the problem and solutions solving the problem. But, some embodiments are also applicable to other technologies, such as 3GPP LTE, or 3GPP LTE and NR integration, also denoted as non-standalone NR.

In various contexts, uplink (UL) traffic can be scheduled with dynamic UL grants or configured UL grants. In case of dynamic grants, the gNB (an NR base station) provides an UL grant to the UE for each UL transmission. Configured grants are pre-allocated, i.e. provided once to the UE. Thereafter, the configured UL grant is valid for usage for UL transmissions according to a configured periodicity. The user equipment (UE) does not need to transmit padding on those UL resources if no UL data is available for transmission, i.e. may skip an UL transmission on such grants.

Some embodiments herein are applicable to an NR-IIoT device that handles communication for multiple service types, e.g. multiple periodic ultra-reliable low-latency communication (URLLC) type robot control messages (also referred to as TSN-like traffic), URLLC type of occasional alarm signals (for which periodic resources would need to be configured or relying on UE to send scheduling request for each occasional alarm message), occasional sensor data transmission (can be time-critical or non-time-critical), and/or other enhanced mobile broadband (eMBB)/MBB best-effort type traffic such as occasional video transmissions or software updates. This mix of service types leads to a traffic mix to be multiplexed by the UE for UL transmissions, i.e. on Medium Access Control (MAC) multiple logical channels with different priorities need to be configured. In such a traffic mix scenario, the URLLC-type of traffic is treated with high priority.

The mixed services support for NR-IIoT use-cases thereby motivates the process of prioritization between grants. For example, when the UE receives grants that at least partially overlap in time, the UE may select which grant to use (e.g., build a single MAC Protocol Data Unit, PDU) so as to effectively prioritize one grant over another. Such prioritization process may rely on several components. Such components may include a value that marks and measures the grant's reliability and/or latency (e.g., as a function of modulation and coding scheme (MCS), coding rate, repetition, etc.) or that identifies which LCH (or group of LCHs) is allowed to be sent on the grant's resources. Either way, this value may be referred to as a grant's transmission profile indication or index (TPI). The components for grant prioritization may alternatively or additionally include whether any MAC Protocol Data Unit (PDU) is constructed (assembled in MAC with logical channel data and/or submitted to physical layer for transmission). The components may alternatively or additionally include transport block (TB) size associated with the grant. Furthermore, among these components is the "availability" of the data which the corresponding Logical Channel (LCH) that it belongs to is mapped to one of the two grants. That is, whether there is any data in the LCH that can be multiplexed on the grant after subject to LCH mapping restriction.

FIG. 1 illustrates one challenge addressed by some embodiments herein with respect to configured grants, e.g., on PUSCH: In the example of FIG. 1, the UE is configured with both a low priority configured grant A (CG-A) and a high priority configured grant B (CG-B). Both grants are known ahead of time, at time t0. The processing deadline for CG-A occurs at time t1, to give the UE a time T'_proc1 to process data for transmission using CG-A, whereas the processing deadline for CG-B occurs at time t2, to give the UE a time T'_proc2 to process data for transmission using CG-B. Before the processing deadline for CG-A occurs at time t1, low priority data arrives in a low priority buffer (LPB). But no high priority data (e.g., critical data) is in a high priority buffer (HPB). Accordingly, a first prioritization decision, at time t1, is to select the low priority configured grant A (CG-A) due to the fact that the higher priority CG-B did not have available critical data at the time. However, as shown, critical data arrives at or before t2, but it cannot be sent over due to the prior decision at t1 of the selection between grants. That is, the second prioritization decision at time t2 cannot select the higher priority CG-B because overlapping CG-A has already been selected according to the first prioritization decision at time t1.

One approach to handling this problem would be to retrigger the Medium Access Control (MAC) prioritization process at t2. See, e.g., R2-1912211, 'Data/data prioritization', CATT, Chongqing, P. R. China, 14-18 Oct. 2019. However, this will cause more complexity in MAC processing.

Certain aspects of the present disclosure and their embodiments may provide solutions to these or other challenges. Some embodiments include several methods to address the problem of late arrival of critical traffic after a decision has been made on overlapping grants prioritization. Some methods are based on splitting the Physical Uplink Shared Channel (PUSCH), or considering Intra-UE preemption and avoiding the multiple triggering of MAC Prioritization among overlapping grant method, or re-triggering of MAC prioritization among overlapping grants.

Certain embodiments may provide one or more of the following technical advantage(s). Some embodiments solve the problem of late critical traffic arrival, while reducing MAC processing complexity, enhancing spectral efficiency, and/or reducing signaling overhead.

Figure 2:
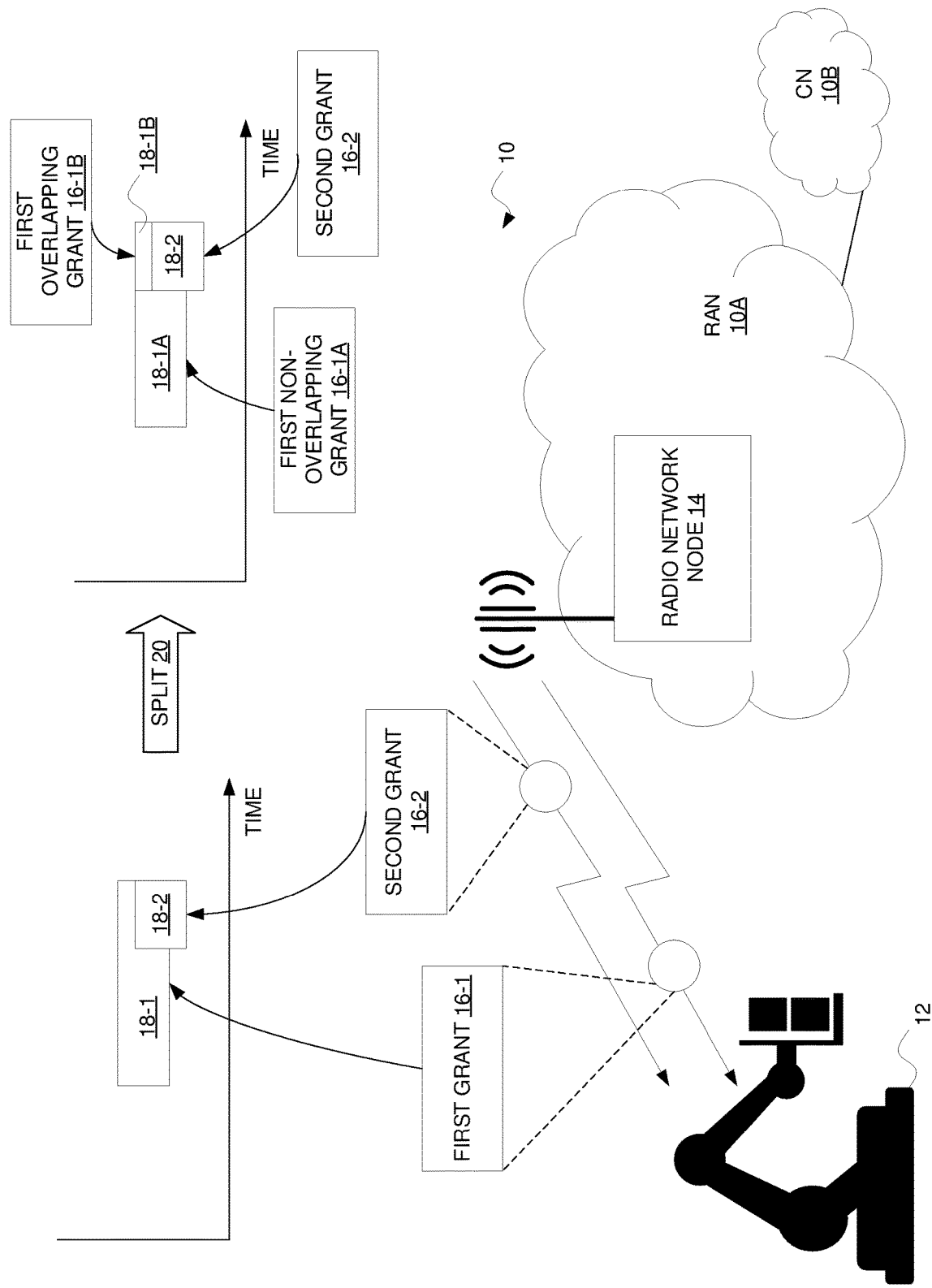
FIG. 2 illustrates the transmission of first and second grants in an example wireless communication network.

FIG. 2 shows a wireless communication network 10 according to some embodiments, e.g., in an IIoT system. The wireless communication network 10 includes a radio access network (RAN) 10A and a core network 10B. The wireless communication network 10 as shown in this example also includes a wireless device 12, e.g., an IoT device such as a robotic arm. The RAN 10A includes a radio network node 14 (e.g., a base station) that controls the allocation and use of radio resources (e.g., time-frequency resources) for wireless devices served by the radio network node 14.

In some embodiments in this regard, the radio network node 14 transmits a first grant 16-1 to the wireless device 12. The first grant 16-1 allocates first radio resources 18-1 for use by the wireless device 12. In some embodiments, the first grant 16-1 is a configured grant (e.g., that periodically recurs), whereas in other embodiments the first grant 16-1 is a dynamic grant. In either case, the first grant 16-1 may be associated with a data channel, e.g., a Physical Uplink Shared Channel (PUSCH). In other embodiments, though, the first grant 16-1 is associated with a control channel, e.g., a Physical Uplink Control Channel (PUCCH).

Regardless, the radio network node 14 also transmits a second grant 16-2 to the wireless device 12, e.g., only after having already transmitted the first grant 16-1 to the wireless device 12. In some embodiments, the second grant 16-2 is a configured grant (e.g., that periodically recurs). In some embodiments, the second grant 16-2 is associated with a data channel, e.g., a PUSCH.

In any case, the second grant 16-2 allocates second radio resources 18-2 for use by the wireless device 12. As shown, the first radio resources 18-1 partially overlap in time with the second radio resources 18-2. Indeed, in the example shown, the first radio resources 18-1 start earlier in time than the second radio resources 18-2, but the second radio resources 18-2 start before the first radio resources 18-2 end. In this and other cases, then, the first radio resources 18-1 may span a duration in time that is longer than a duration in time spanned by the second radio resources 18-2.

The wireless device 12 could make a decision (e.g., at the Medium Access Layer, MAC, of the device 12) before the start of the first radio resources 18-1 to use the first grant 16-1 for transmission of relatively low priority data. After that decision to use the first grant 16-1, though, higher priority data may arrive at the wireless device 12 for transmission by the wireless device 12. This late arrival of high priority data complicates the wireless device's use of the first and second grants 16-1, 16-2.

According to some embodiments herein, the wireless device 12 splits 20 the first grant 16-1 into two or more grants, including a first non-overlapping grant 16-1A and a first overlapping grant 16-1B. The first non-overlapping grant 16-1A allocates a portion 18-1A of the first radio resources 18-1 which do not overlap in time with the second radio resources 18-2. The first overlapping grant 16-1B, by contrast, allocates another portion 18-1B of the first radio resources 18-1 which do overlap in time with the second radio resources 18-2. In some embodiments, these portions 18-1A, 18-1B are contiguous in time.

In some embodiments, the wireless device 12 performs this split 20 of the first grant 16-1 proactively, before the arrival of the higher priority data. The wireless device 12 may, for instance, perform the split 20 upon reception of the first grant 16-1, before or upon selecting to use the first grant 16-1, or after the start of the first radio resources 18-1 but before a deadline for selecting to use the second grant 16-2. In other embodiments, the wireless device 12 performs this split 20 of the first grant 16-1 reactively, e.g., after the arrival of the higher priority data.

Either way, splitting of the first grant 16-1 in this way may advantageously allow the wireless device to perform grant prioritization between the first overlapping grant 16-1B and the second grant 16-2 (and not between the first non-overlapping grant 16-1A and the second grant 16-2). This effectively delays the prioritization decision until a later time, to accommodate later arrival of high priority traffic. Indeed, rather than having to make the grant prioritization decision before the deadline for selecting to use the first grant 16-1, the wireless device 12 is able to delay the prioritization decision until the deadline for selecting to use the second grant 16-2. In any event, performing this grant prioritization may involve determining a priority of the first overlapping grant 16-1B and a priority of the second grant 16-2, and selecting to use whichever of the first overlapping grant 16-1B and the second grant 16-2 has a higher priority.

In some embodiments, for example, the wireless device 12 may generate a first non-overlapping uplink transmission, such as a first non-overlapping Medium Access Control (MAC) Protocol Data Unit (PDU), for transmission using the first non-overlapping grant 16-1A. The wireless device 12 may also generate a first overlapping uplink transmission, such as a first overlapping MAC PDU, and a second uplink transmission, such as a second MAC PDU. The wireless device 12 may then select between performing the first overlapping uplink transmission using the first overlapping grant 16-1A and performing the second uplink transmission using the second grant 16-2, based on respective priorities of the first overlapping grant 16-1A and the second grant 16-2. The wireless device 12 may then perform either the first overlapping uplink transmission using the first overlapping grant 16-1A or the second uplink transmission using the second grant 16-2, according to that selection.

Note that in some embodiments the wireless device 12 performs this split 20 based on control signaling (not shown) received from the network node 14. The control signaling may indicate that the wireless device 12 is to split the first grant 16-1, for instance. Alternatively, the control signaling may indicate that the wireless device 12 is to split any grant that allocates radio resources which overlap in time with radio resources allocated by another grant.

Although not shown in FIG. 2, in other embodiments the split 20 may be performed by the radio network node 14 in addition to or instead of the wireless device 12. In one such embodiment, then, the radio network node 14 effectively reconfigures the first grant 16-1 so as to split the first grant 16-1 into the first non-overlapping grant 16-1A and the first overlapping grant 16-1B. The radio network node 14 then transmits the first non-overlapping grant 16-1A and the first overlapping grant 16-1B to the wireless device 12.

Alternatively, the radio network node 14 may configure the first non-overlapping grant 16-1A and the first overlapping grant 16-1B at the outset, without having ever configured the first grant 16-1 to begin with. This may be the case for instance if the radio network node 14 configures the second grant 16-2 for allocating the second radio resources 18-2 before or concurrently with allocating the first radio resources 18-1. In this case, the radio network node 14 may identify that the overlap would or will occur. Accordingly, rather than ever configuring the first grant 16-1, the radio network node 14 may instead already configure the first non-overlapping grant 16-1A and the first overlapping grant 16-1B.

Figure 3:
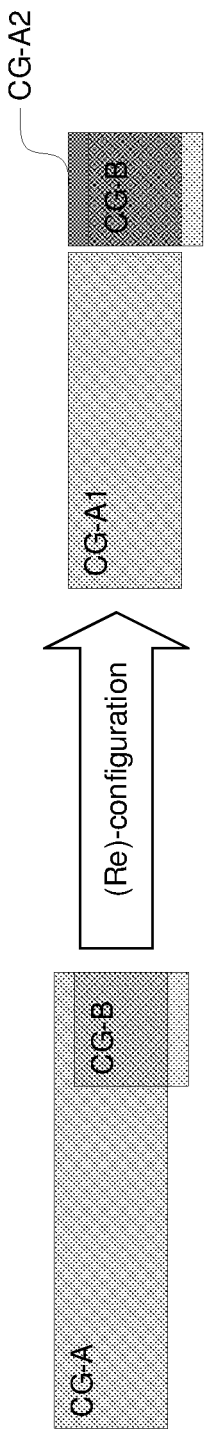
FIG. 3 illustrates an example scenario in which a configured grant CG-A is split into grants CG-A1 and CG-A2.

More particularly, embodiments herein include one or more of the following modification methods to the Intra-UE multiplexing rules to prioritize between grants while avoiding the problems discussed above:
1. Method A: Solution based on PUSCH modification, i.e., re-configuration and/or splitting of PUSCH.
2. Method B: Solution based on Intra-UE Preemption
3. Method C: Retriggering of prioritization process, just before each PUSCH starting Orthogonal Frequency Division Multiplexing (OFDM) symbol (OS)
4. Method D: Avoid retriggering of MAC prioritization process Method A: PUSCH Re-Configuration or Split According to a first category of techniques referred to herein as "Method A," a UE/gNB may re-configure overlapping grants into 1) exactly overlapping parts (similar starting and ending Orthogonal Frequency Division Multiplexing (OFDM) symbol (OS)) and 2) non-overlapping part. FIG. 3 shows one example, where CG-A is split into CG-A1 and CG-A2, with CG-A1 exemplifying the first non-overlapping grant 16-1A from FIG. 2 and CG-A2 exemplifying the first overlapping grant 16-1B from FIG. 2. This can be done by either a) gNB command (however, it may cost expensive overhead for short periodicity overlapping CGs), or b) a modification to the 3GPP specification, such that if there is an overlapping part between long PUSCH and short PUSCH that don't start at similar OFDM symbols (US), the splitting of the long PUSCH resource is applied so that the PUSCH is split into non-overlapping and overlapping parts.

The UE MAC will in this case generate two or three MAC PDUs, one PDU for the non-overlapping part (call it PDU-S), and two for the overlapping part (call it PDU-O1 and PDU-O2). The UE MAC passes PDU-S corresponding to the non-overlapping part to the Physical Layer (PHY). The UE MAC applies the prioritization process only on the PDUs corresponding to the overlapping parts (i.e., PDU-O1 and PDU-O2), at the latest time possible just before the overlapping grants with same OS boundaries. The UE MAC sends the selected PDU out of the prioritization process (either PDU-O1 or PDU-O2) to PHY.

In some embodiments, the uplink (UL) resource for PUSCH overlapping with another PUSCH can be split into one or more parts according to a rule in the 3GPP specification. In particular, in case of overlapping UL data resources in time with different priorities, the resource of the longer PUSCH can be split into at least two parts, namely one or two non-overlapping parts and one completely overlapping part. In some cases, whether to skip some PUSCH (after splitting) depends on the length of the PUSCH. That is, PUSCH is dropped (i.e., a UE is not expected to transmit PUSCH on this part) if its length is less than a certain threshold. In another case, any non-overlapping part that may follow the overlapping part may be skipped (i.e., a UE is not expected to transmit PUSCH on this part).

In any event, after splitting, MAC prioritization is performed only on the overlapping part as described above.

In some embodiments, the UL resource split as mentioned above can be enabled by a higher layer parameter, e.g., an RRC parameter. Once enabled, the UL data resource split subject to timeline constraint is applied to low priority PUSCH resource which overlaps with the high priority PUSCH resource scheduled/activated by any of: (i) a specific Downlink Control Information (DCI) format, e.g., new Rel-16 DCI format 0_2 for PUSCH scheduling or CG activation, (ii) a DCI monitored in a specific CORESET or search space; (iii) a DCI with cyclic redundancy check (CRC) scrambled by a specific Radio Network Temporary Identity (RNTI); or (iv) a DCI with filed containing the split information. The timeline constraint may be related to whether UE can identify the overlapping resource before the start of low priority PUSCH. In case that the timeline is not met, the split is neglected.

Alternatively, once enabled, UE also monitors a specific DCI or downlink (DL) signal containing explicit indication of the UL resource split. If detected, UL data resource split subject to timeline constraint is applied to low priority PUSCH resource which overlaps with the high priority PUSCH resource. The timeline constraint in this case is related to the time needed for UE to process UL resource split indication and the start of low priority PUSCH resource. In case that the timeline is not met, the split is neglected.

In some cases, the same modulation and coding scheme (MCS) and frequency domain resources are applied to all splits. That is, the UE recalculates a new transport block size (TBS) for each split.

In some cases, the TBS calculated from the original UL grant is used for all splits.

The presence of Demodulation Reference Signal (DMRS) and its position for each spit is determined according to PUSCH mapping type B.

Method B: Intra-UE Pre-Emption

Another category of techniques is referred to herein as "Method B." Consider first PUSCH-vs-PUSCH. When a later, higher-priority, PUSCH (called PUSCH-B in the following) needs to pre-empt an earlier, lower-priority, PUSCH (called PUSCH-A in the following), an intra-UE pre-emption procedure is applied. The intra-UE pre-emption procedure can be also considered part of the intra-UE prioritization/multiplexing procedure.

In case of PUSCH repetitions, the pre-emption of PUSCH-A by a higher-priority PUSCH (i.e., PUSCH-B) is applied to each repetition of PUSCH-A individually that overlaps in time with PUSCH-B. The repetition may refer to the nominal repetition or an actual repetition in case of Rel-16 PUSCH repetition, where the nominal repetition refers to a repetition as scheduled by the Downlink Control Information (DCI), and the actual repetition refers to the repetitions after applying splitting (if necessary) to the nominal repetitions. The splitting may be done due to slot boundary or symbols unavailable for PUSCH transmission.

Figure 4:
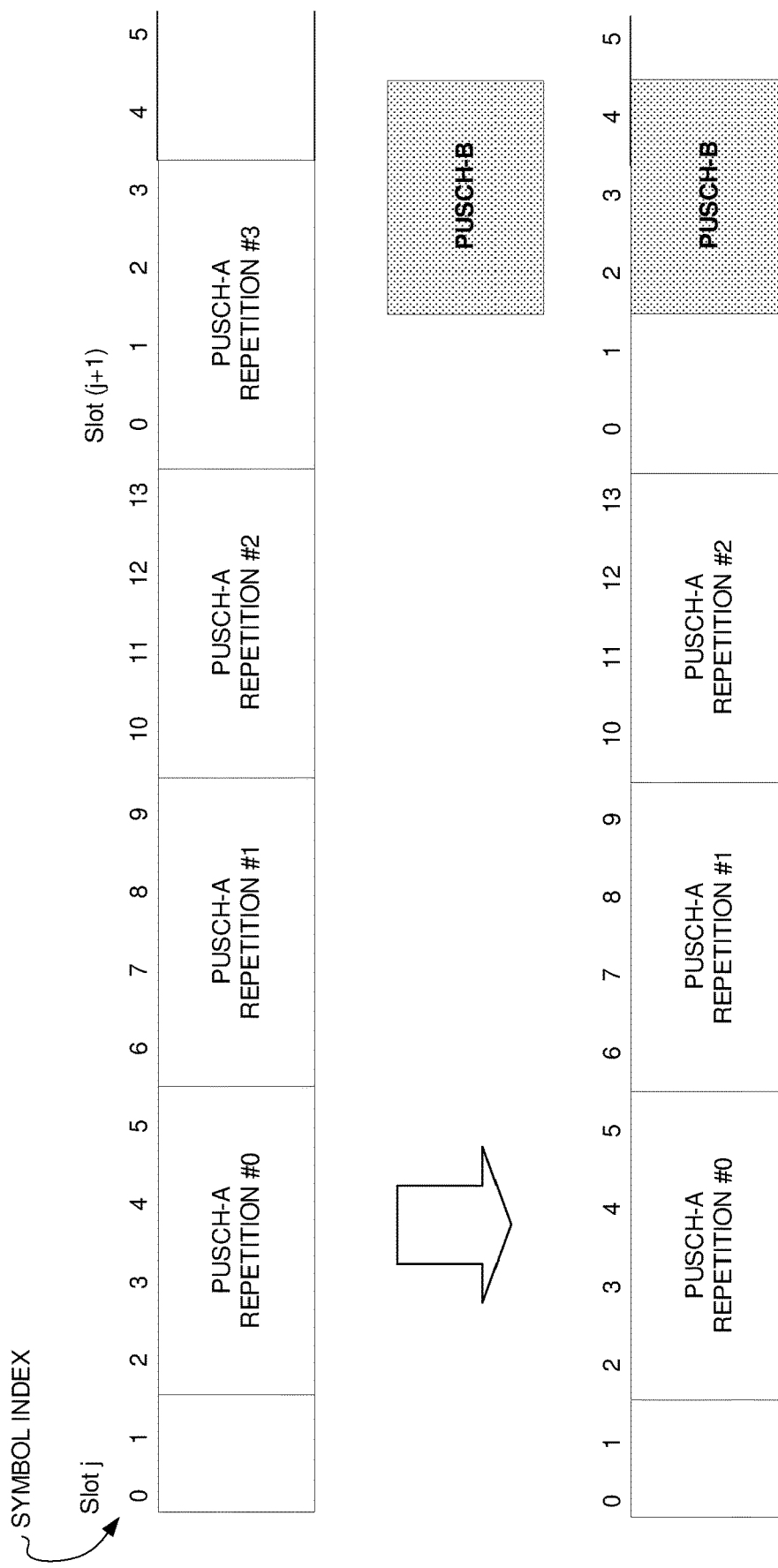
FIG. 4 shows an example scenario where one scheduled physical uplink shared channel (PUSCH) transmission overlaps in time with a repetition of another PUSCH transmission.
Figure 5:
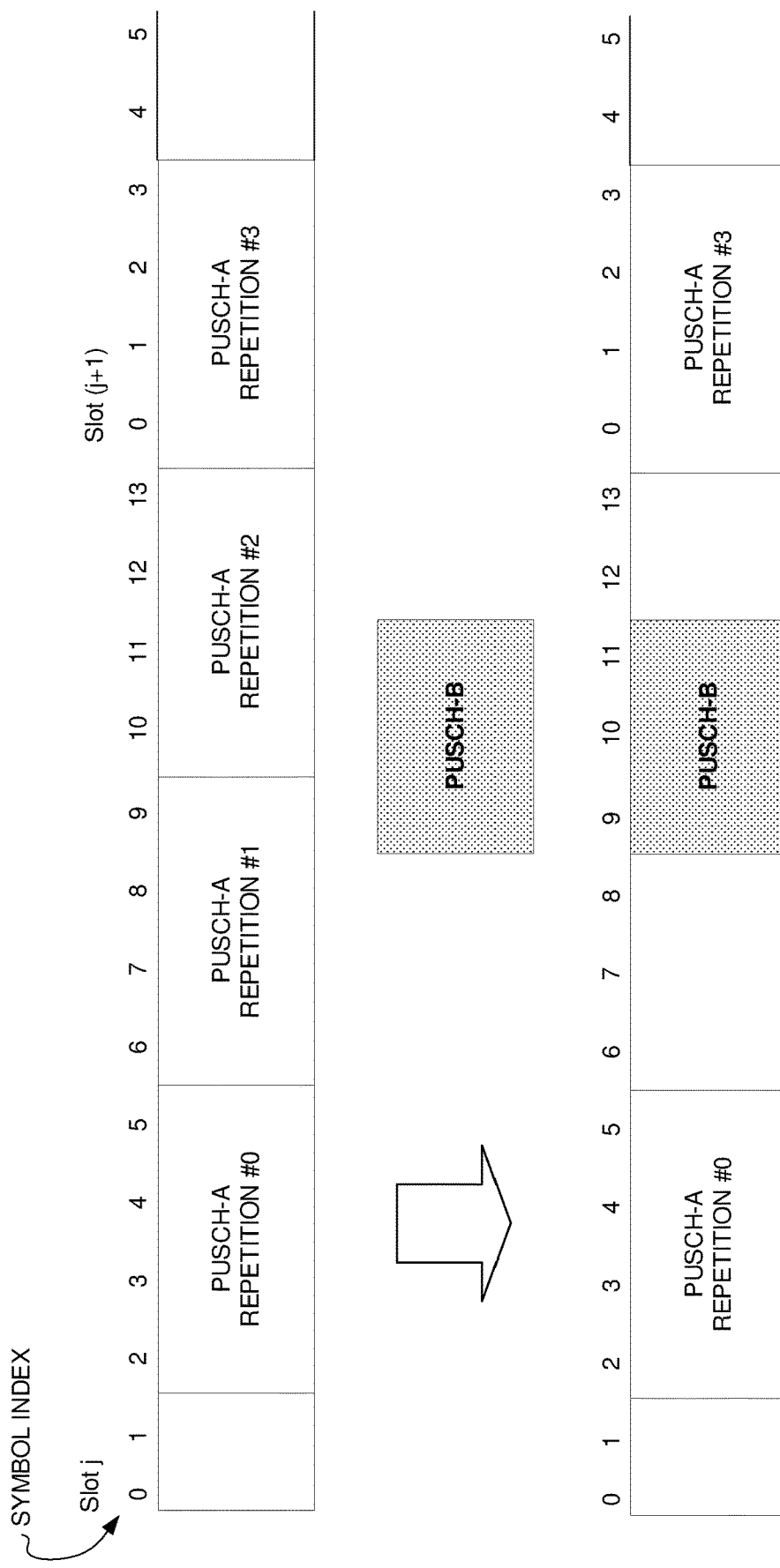
FIG. 5 illustrates an example scenario where one scheduled physical uplink shared channel (PUSCH) transmission overlaps in time with two repetitions of another PUSCH transmission.

This is illustrated by two examples shown in FIG. 4 and FIG. 5. In FIG. 4, PUSCH-B overlaps in time with PUSCH-A repetition #3, causing PUSCH-A repetition #3 to be dropped or canceled, assuming that the timeline for dropping it is satisfied. In FIG. 5, PUSCH-B overlaps in time with PUSCH-A repetition #1 and #2, causing PUSCH-A repetition #1 and #2 to be dropped or canceled, assuming that the timeline for dropping is satisfied.

Both PUSCH-A and PUSCH-B can be either dynamically scheduled PUSCH or UL-CG PUSCH.

In some embodiments, this method B is considered to be supported by Method D (discussed in further detail below), i.e., MAC sends down to PHY the newly construct PDU based on Method D, and PHY does the pre-emption based on this method (Method B: PSUCH vs PUSCH).

Consider next PUSCH-vs-PUCCH (Physical Uplink Control Channel). In Rel-15, PUCCH can be repeated across slots, where a PUCCH transmission in each of the repeated $N_{PUCCH}^{repeat}$ NPUCCH slots has a same number of consecutive symbols. This is called slot-by-slot repetition in the discussion below.

Figure 6:
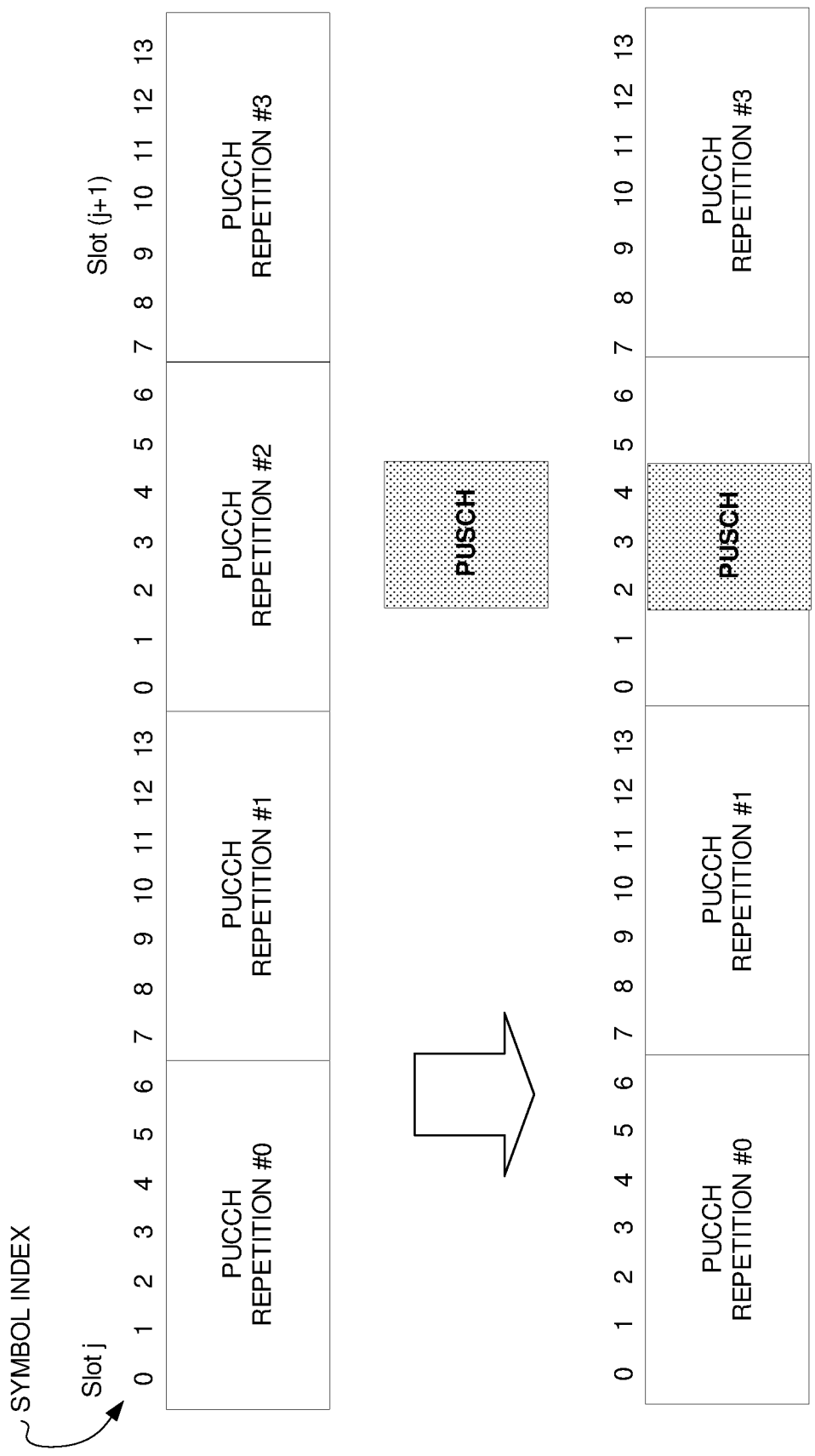
FIG. 6 shows an example of intra-UE uplink pre-emption, where a PUSCH (of higher priority) overlaps a PUCCH (of lower priority) repetition, causing the PUCCH repetition to be dropped.

In Rel-16, sub-slots are defined for HARQ-ACK transmission. Hence a PUCCH can be repeated across consecutive sub-slots. For example, FIG. 6 illustrates the sub-slot configuration of seven symbols per UL slot, with two sub-slots in one UL slot. The PUCCH is repeated four times across sub-slots in the example of FIG. 6.

Rel-15 specifies that if PUCCH transmission would overlap with the PUSCH transmission in one or more slots, the UE transmits the PUCCH and does not transmit the PUSCH in the overlapping slots. However, in Rel-16, the priority levels of the PUSCH of PUCCH should be taken into account when determining which one should be dropped. For the use case that an urgent, high-priority PUSCH is triggered by the MAC, if the PUCCH is of lower priority, the high-priority PUSCH should be transmitted, while the PUCCH repetition(s) in the overlapping UL slot(s) should be dropped. FIG. 6 shows an example of intra-UE UL preemption, where PUSCH (of higher priority) overlaps PUCCH (of lower priority) repetition #2, causing PUCCH repetition #2 to be dropped.

Method C: Retriggering of MAC prioritization process.

A third category of techniques, referred to herein as "Method C," comprises retriggering the prioritization process, just before each PUSCH starting OS, based on one or more of the following:
 a. If both overlapping grants are not starting on similar time, and the later grant (or PUSCH) is the de-prioritized one.
 b. Upon arrival of data that belongs to the following:
  Any LCH data
  Only LCHs that belongs to the de-prioritized grant in the selection process
  Only LCH that belong to de-prioritized grant, only in case the de-prioritized grant was of higher priority.
 c. If the previous occasion of prioritization process was conducted when there was no MAC PDU has been generated,
  Means that no need for retriggering in-case of pre-emption or so.
 d. If the later grant (the de-prioritized one) had a high grant priority (DCI or RRC based priority).

Method D: Avoid Retriggering of MAC Prioritization Process.

A fourth category of techniques referred to herein as "Method D" relies on first triggering the MAC Prioritization process before the early starting PUSCH. Second, if the decision is made that the low priority grant will be selected, construct MAC PDU of specific set of LCHs that are mapped to CG-B, enough before the time of its starting, e.g., at time t2 in FIG. 1. In this case, there is no need to retrigger the MAC prioritization process between overlapping grants.

Note that this method is considered to support Method B, i.e., MAC sends down to PHY the newly construct PDU, and PHY does the pre-emption as described in Method B.

Figure 7:
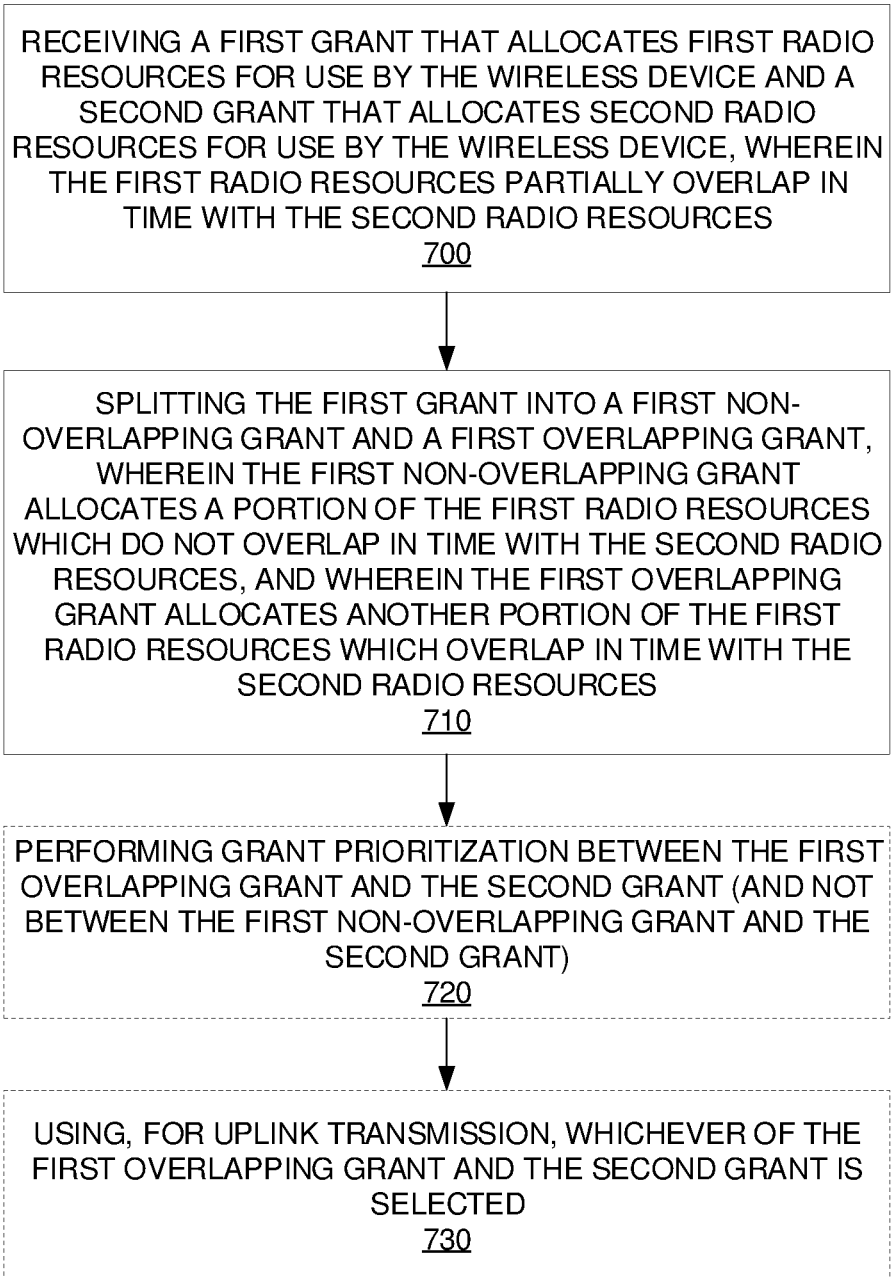
FIG. 7 illustrates an example method carried out by a wireless device, according to some embodiments.

In view of the detailed examples provided above, it will be appreciated that FIG. 7 depicts an example method performed by a wireless device 12 in accordance with particular embodiments of the presently disclosed embodiments, where the split 20 illustrated in FIG. 2 is performed by the wireless device 12. The method shown in FIG. 7 includes receiving a first grant 16-1 that allocates first radio resources 18-1 for use by the wireless device 12 and a second grant 16-2 that allocates second radio resources 18-2 for use by the wireless device 12 (Block 700). The first radio resources 18-1 partially overlap in time with the second radio resources 18-2. The first grant 16-1 may be received before the second grant 16-2, in some embodiments or instances.

The illustrated method also comprises splitting the first grant 16-1 into a first non-overlapping grant 16-1A and a first overlapping grant 16-1B (Block 710). The first non-overlapping grant 16-1A allocates a portion 18-1A of the first radio resources 18-1 which do not overlap in time with the second radio resources 18-2. And the first overlapping grant 16-1B allocates another portion 18-1B of the first radio resources 18-1 which overlap in time with the second radio resources 18-2.

In some embodiments or instances, the method also comprises performing grant prioritization between the first overlapping grant 16-1B and the second grant 16-2 (and not between the first non-overlapping grant 16-1A and the second grant 16-2) (Block 720). This may entail, for instance, determining a priority of the first overlapping grant 16-1B and a priority of the second grant 16-2, and selecting to use whichever of the first overlapping grant 16-1B and the second grant 16-2 has a higher priority. In any event, the method may also comprise using, for uplink transmission, whichever of the first overlapping grant 16-1B and the second grant 16-2 is selected (Block 730).

Thus, for example, the method may comprise generating a first non-overlapping uplink transmission for transmission using the first non-overlapping grant and generating a first overlapping uplink transmission and a second uplink transmission. The method may further comprise selecting between performing the first overlapping uplink transmission using the first overlapping grant and performing the second uplink transmission using the second grant, based on respective priorities of the first overlapping grant and the second grant. Finally, the method may comprise performing either the first overlapping uplink transmission using the first overlapping grant or the second uplink transmission using the second grant, according to this selection.

In some of these embodiments or instances, the first non-overlapping uplink transmission, the first overlapping uplink transmission, and the second uplink transmission are each a Medium Access Control (MAC) Protocol Data Unit (PDU). In some of these embodiments, the first non-overlapping uplink transmission is passed from a MAC layer of the wireless device to a physical layer of the wireless device, and the selecting then comprises selecting between passing the first overlapping uplink transmission from the MAC layer of the wireless device to the physical layer of the wireless device or passing the second uplink transmission from the MAC layer to the physical layer. In some embodiments, this selecting is performed after a start of the first non-overlapping uplink grant but before a start of the first overlapping uplink grant.

In some embodiments or instances of the method illustrated generally in FIG. 7, the first grant is a configured grant that periodically recurs. In others, the first grant is a dynamic grant. Likewise, in various embodiments or instances, the second grant may be a configured grant that periodically recurs.

In some embodiments of the illustrated method, the first radio resources are associated with a first uplink data channel and the second radio resources are associated with a second uplink data channel. For example, the first uplink data channel may be a first Physical Uplink Shared Channel (PUSCH) and the second uplink data channel may be a second PUSCH.

The first radio resources span a first duration in time and the second radio resources span a second duration in time. In some embodiments or instances, the first duration is longer than the second duration. The first radio resources may start earlier in time than the second radio resources. In these embodiments or instances, then, the portion of the first radio resources allocated by the first non-overlapping grant may occur earlier in time than the portion of the first radio resources allocated by the first overlapping grant.

In some embodiments, the method shown generally in FIG. 7 may further comprise determining whether to use or skip the first non-overlapping grant, based on whether the portion of the first radio resources allocated by the first non-overlapping grant span a duration less than a threshold, or may comprise determining whether to use or skip the first overlapping grant, based on whether the portion of the first radio resources allocated by the first overlapping grant span a duration less than a threshold.

In some embodiments, the method may comprise receiving control signaling indicating that the wireless device is to split the first grant, or that the wireless device is to split any grant that allocates radio resources which overlap in time with radio resources allocated by another grant. This control signaling may comprise downlink control information (DCI), for example.

In various embodiments or instances, the second grant may have a higher priority than the first grant. The method may comprise recalculating a transport block size for each of the first non-overlapping grant and the first overlapping grant, in some embodiments.

Figure 8:
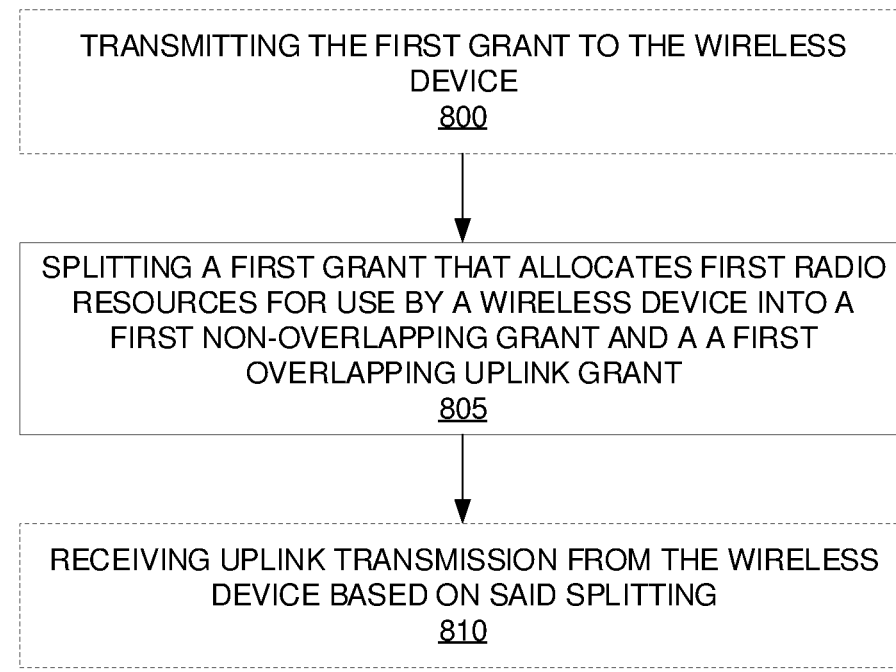
FIG. 8 illustrates an example method carried out by a radio network node, according to some embodiments.

FIG. 8 depicts a method performed by a radio network node 14 in accordance with other particular embodiments, where the split 20 is performed by the radio network node 14. The illustrated method includes splitting a first grant 16-1 that allocates first radio resources 18-1 for use by a wireless device 12 into a first non-overlapping grant 16-1A and a first overlapping grant 16-1B (Block 805). The first non-overlapping grant 16-1A allocates a portion 18-1A of the first radio resources 18-1 which do not overlap in time with second radio resources 18-2 allocated by a second grant 16-2 for use by the wireless device 12. The first overlapping grant 16-1B allocates another portion 18-1B of the first radio resources 18-1 which overlap in time with the second radio resources 18-2. The first overlapping uplink grant may be contiguous in time with the first non-overlapping uplink grant, in some instances or embodiments.

In some embodiments, the method may also comprise receiving uplink transmission from the wireless device 12 based on said splitting (Block 810).

In some embodiments, the method further comprises transmitting the first grant 16-1 to the wireless device 12 (Block 800). In this case, the splitting in Block 805 may be performed after transmitting the first grant 16-1 to the wireless device 12.

In some embodiments or instances, the first grant may be a configured grant that periodically recurs. In others, the first grant may be a dynamic grant. Likewise, in some embodiments or instances, the second grant may be a configured grant that periodically recurs.

In some embodiments or instances, the first radio resources are associated with a first uplink data channel and the second radio resources are associated with a second uplink data channel. In some of these embodiments, for example, the first uplink data channel is a first PUSCH and the second uplink data channel is a second PUSCH.

The first radio resources span a first duration in time and the second radio resources span a second duration in time. In some embodiments or instances, the first duration is longer than the second duration. The first radio resources may start earlier in time than the second radio resources. In these embodiments or instances, then, the portion of the first radio resources allocated by the first non-overlapping grant may occur earlier in time than the portion of the first radio resources allocated by the first overlapping grant.

In some embodiments or instances, the second grant has a higher priority than the first grant.

FIG. 9 shows a method performed by a radio network node according to related embodiments. The method comprises transmitting, to a wireless device 12, a first non-overlapping uplink grant 16-1A and a first overlapping uplink grant 16-1B (Block 900). The first non-overlapping grant 16-1A allocates a portion 18-1A of first radio resources 18-1 which do not overlap in time with second radio resources 18-2 allocated by a second grant 16-2 for use by the wireless device 12. The first overlapping grant 16-1B is contiguous in time with the first non-overlapping grant 16-1A and allocates another portion 18-1B of the first radio resources 18-1 which overlap in time with the second radio resources 18-2.

In some embodiments, the method further comprises receiving uplink transmission from the wireless device 12 using the first non-overlapping uplink grant 16-1A and/or the first overlapping uplink grant 16-1B (Block 910).

Likewise, FIG. 10 depicts a corresponding method performed by a wireless device 12 in accordance with particular embodiments. The method includes receiving a first non-overlapping grant 16-1A and a first overlapping grant 16-1B (Block 1050). The first non-overlapping grant 16-1A allocates a portion 18-1A of the first radio resources 18-1 which do not overlap in time with second radio resources 18-2 allocated by a second grant 16-2 for use by the wireless device 12. The first overlapping grant 16-1B allocates another portion 18-1B of the first radio resources 18-1 which overlap in time with the second radio resources 18-2.

In some embodiments, the method also comprises performing grant prioritization between the first overlapping grant 16-1B and the second grant 16-2 (and not between the first non-overlapping grant 16-1A and the second grant 16-2) (Block 1060). This may entail for instance determining a priority of the first overlapping grant 16-1B and a priority of the second grant 16-2, and selecting to use whichever of the first overlapping grant 16-1B and the second grant 16-2 has a higher priority. In any event, the method may also comprise using, for uplink transmission, whichever of the first overlapping grant 16-1B and the second grant 16-2 is selected (Block 1070).

The variations discussed above for the method shown in FIG. 7 are also applicable to the method of FIG. 10. Thus, for example, the method may comprise generating a first non-overlapping uplink transmission for transmission using the first non-overlapping grant and generating a first overlapping uplink transmission and a second uplink transmission. The method may further comprise selecting between performing the first overlapping uplink transmission using the first overlapping grant and performing the second uplink transmission using the second grant, based on respective priorities of the first overlapping grant and the second grant. Finally, the method may comprise performing either the first overlapping uplink transmission using the first overlapping grant or the second uplink transmission using the second grant, according to this selection.

Likewise, in some of these embodiments, the first non-overlapping uplink transmission, the first overlapping uplink transmission, and the second uplink transmission are each a Medium Access Control (MAC) Protocol Data Unit (PDU). In some of these embodiments, the first non-overlapping uplink transmission is passed from a MAC layer of the wireless device to a physical layer of the wireless device, and the selecting then comprises selecting between passing the first overlapping uplink transmission from the MAC layer of the wireless device to the physical layer of the wireless device or passing the second uplink transmission from the MAC layer to the physical layer. In some embodiments, this selecting is performed after a start of the first non-overlapping uplink grant but before a start of the first overlapping uplink grant.

In some embodiments or instances of the method illustrated generally in FIG. 10, the first grant is a configured grant that periodically recurs. In others, the first grant is a dynamic grant. Likewise, in various embodiments or instances, the second grant may be a configured grant that periodically recurs.

In some embodiments of the illustrated method, the first radio resources are associated with a first uplink data channel and the second radio resources are associated with a second uplink data channel. For example, the first uplink data channel may be a first Physical Uplink Shared Channel (PUSCH) and the second uplink data channel may be a second PUSCH.

The first radio resources span a first duration in time and the second radio resources span a second duration in time. In some embodiments or instances, the first duration is longer than the second duration. The first radio resources may start earlier in time than the second radio resources. In these embodiments or instances, then, the portion of the first radio resources allocated by the first non-overlapping grant may occur earlier in time than the portion of the first radio resources allocated by the first overlapping grant.

In some embodiments, the method shown generally in FIG. 10 may further comprise determining whether to use or skip the first non-overlapping grant, based on whether the portion of the first radio resources allocated by the first non-overlapping grant span a duration less than a threshold, or may comprise determining whether to use or skip the first overlapping grant, based on whether the portion of the first radio resources allocated by the first overlapping grant span a duration less than a threshold.

In some embodiments, the method may comprise receiving control signaling indicating that the wireless device is to split the first grant, or that the wireless device is to split any grant that allocates radio resources which overlap in time with radio resources allocated by another grant. This control signaling may comprise downlink control information (DCI), for example.

In various embodiments or instances, the second grant may have a higher priority than the first grant. The method may comprise recalculating a transport block size for each of the first non-overlapping grant and the first overlapping grant, in some embodiments.

The methods shown in FIG. 7, FIG. 8, FIG. 9, and FIG. 10 may be understood to be different variations of the techniques described above as Method A.

Alternatively or additionally to the embodiments described above, some embodiments herein allow a wireless device's physical layer to perform pre-emption on a repetition by repetition basis, so that higher priority traffic may selectively puncture some repetitions of lower priority-traffic while still allowing transmission of other repetitions of the lower priority traffic.

Figure 11:
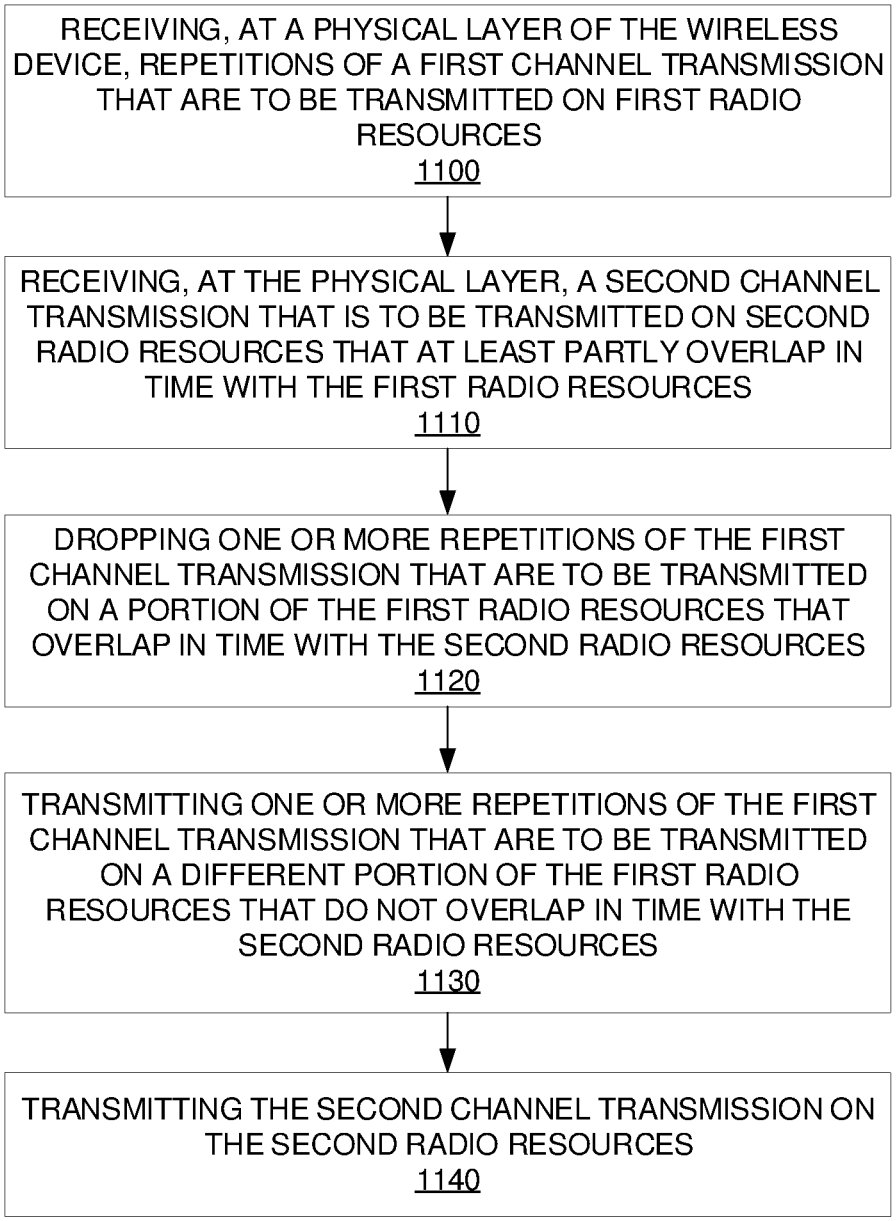
FIG. 11 illustrates still another example method carried out by a wireless device, according to some embodiments.

Thus, FIG. 11 depicts another method performed by a wireless device 12 in accordance with particular embodiments. This example method includes receiving, at a physical layer of the wireless device 12, repetitions of a first channel transmission that are to be transmitted on first radio resources (Block 1100). The method also includes receiving, at the physical layer, a second channel transmission that is to be transmitted on second radio resources that at least partly overlap in time with the first radio resources (Block 1110). The method further includes dropping one or more repetitions of the first channel transmission that are to be transmitted on a portion of the first radio resources that overlap in time with the second radio resources (Block 1120).

In some embodiments, the method also includes transmitting one or more repetitions of the first channel transmission that are to be transmitted on a different portion of the first radio resources that do not overlap in time with the second radio resources (Block 1130). The method may further include transmitting the second channel transmission on the second radio resources (Block 1140).

Group AAA embodiments in the EMBODIMENTS section herein exemplifies some additional aspects of the method in FIG. 11 according to different variations. Furthermore, Methods B and/or D, as described below, exemplify various aspects of the method in FIG. 11 according to some embodiments.

Embodiments herein also include corresponding apparatuses. Embodiments herein for instance include a wireless device 12 configured to perform any of the steps of any of the embodiments described above for the wireless device 12.

Embodiments also include a wireless device 12 comprising processing circuitry and power supply circuitry. The processing circuitry is configured to perform any of the steps of any of the embodiments described above for the wireless device. The power supply circuitry is configured to supply power to the wireless device.

Embodiments further include a wireless device 12 comprising processing circuitry. The processing circuitry is configured to perform any of the steps of any of the embodiments described above for the wireless device. In some embodiments, the wireless device further comprises communication circuitry.

Embodiments further include a wireless device 12 comprising processing circuitry and memory. The memory contains instructions executable by the processing circuitry whereby the wireless device is configured to perform any of the steps of any of the embodiments described above for the wireless device.

Embodiments moreover include a user equipment (UE). The UE comprises an antenna configured to send and receive wireless signals. The UE also comprises radio front-end circuitry connected to the antenna and to processing circuitry and configured to condition signals communicated between the antenna and the processing circuitry. The processing circuitry is configured to perform any of the steps of any of the embodiments described above for the wireless device. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node 14 configured to perform any of the steps of any of the embodiments described above for the radio network node.

Embodiments also include a radio network node 14 comprising processing circuitry and power supply circuitry. The processing circuitry is configured to perform any of the steps of any of the embodiments described above for the radio network node. The power supply circuitry is configured to supply power to the radio network node.

Embodiments further include a radio network node 14 comprising processing circuitry. The processing circuitry is configured to perform any of the steps of any of the embodiments described above for the radio network node. In some embodiments, the radio network node further comprises communication circuitry.

Embodiments further include a radio network node 14 comprising processing circuitry and memory. The memory contains instructions executable by the processing circuitry whereby the radio network node is configured to perform any of the steps of any of the embodiments described above for the radio network node.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 12:
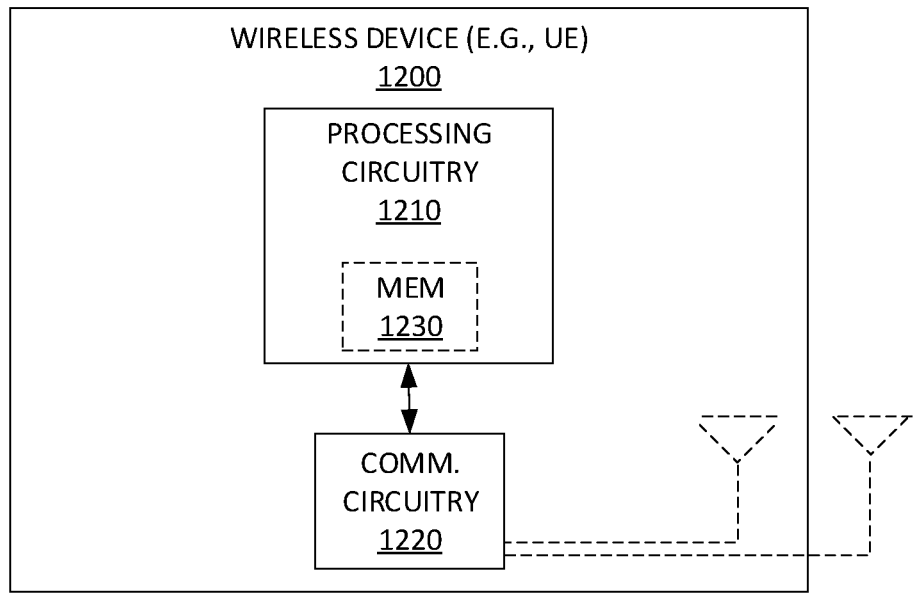
FIG. 12 illustrates details of an example wireless device.

FIG. 12 for example illustrates a wireless device 1200 (e.g., wireless device 12) as implemented in accordance with one or more embodiments. As shown, the wireless device 1200 includes processing circuitry 1210 and communication circuitry 1220. The communication circuitry 1220 (e.g., radio circuitry) is configured to transmit and/or receive information to and/or from one or more other nodes, e.g., via any communication technology. Such communication may occur via one or more antennas that are either internal or external to the wireless device 1200. The processing circuitry 1210 is configured to perform processing described above, such as by executing instructions stored in memory 1230. The processing circuitry 1210 in this regard may implement certain functional means, units, or modules.

Figure 13:
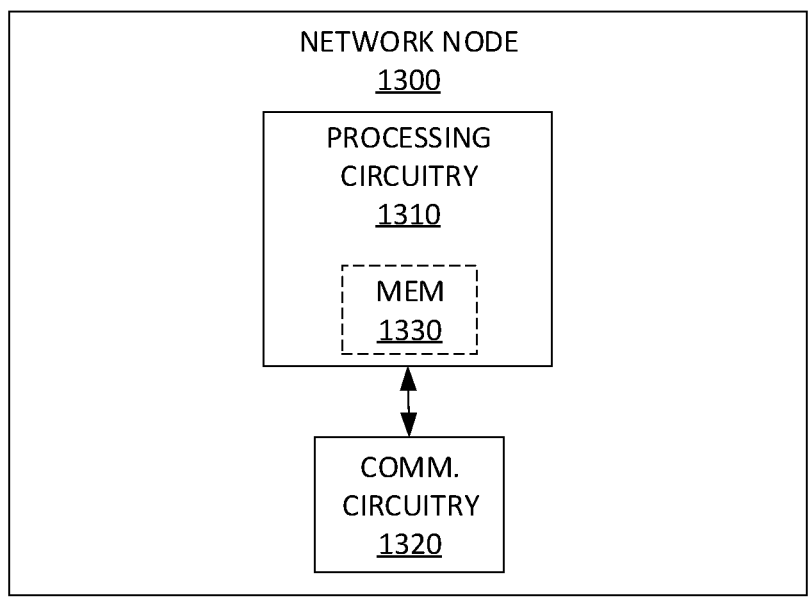
FIG. 13 illustrates details of an example radio network node.

FIG. 13 illustrates a network node 1300 (e.g., radio network node 14) as implemented in accordance with one or more embodiments. As shown, the network node 1300 includes processing circuitry 1310 and communication circuitry 1320. The communication circuitry 1320 is configured to transmit and/or receive information to and/or from one or more other nodes, e.g., via any communication technology. The processing circuitry 1310 is configured to perform processing described above, such as by executing instructions stored in memory 1330. The processing circuitry 1310 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Some embodiments herein have been described for uplink transmission. Other embodiments herein are applicable for downlink transmission. Where applied to downlink transmission, an assignment may be referred to in place of a grant. And the radio network node may perform at least some processing described above as performed by the wireless device.

Figure 14:
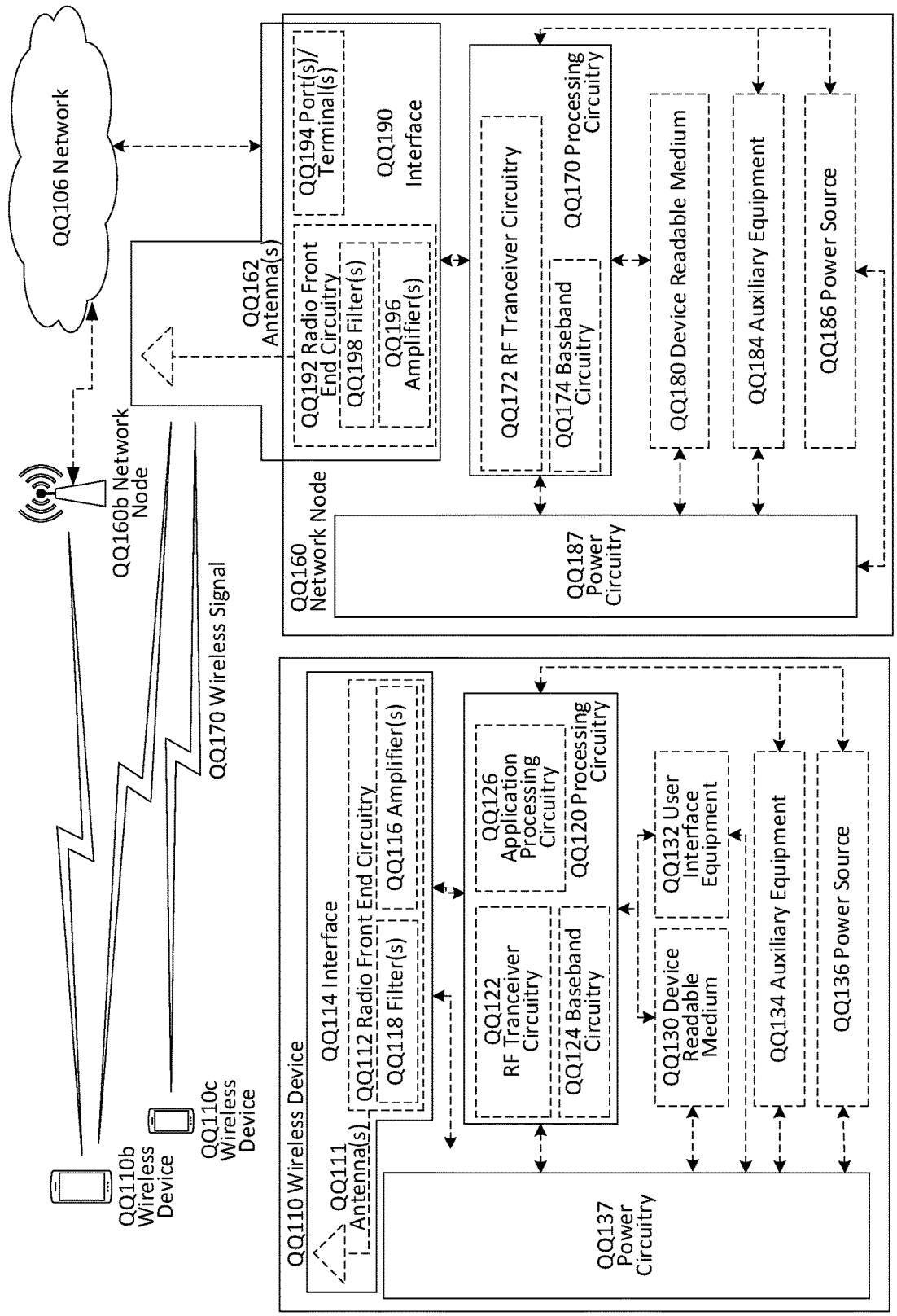
FIG. 14 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 14. For simplicity, the wireless network of FIG. 14 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 14, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 14 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174.

In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 14 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves; radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. AWD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/ or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 15:
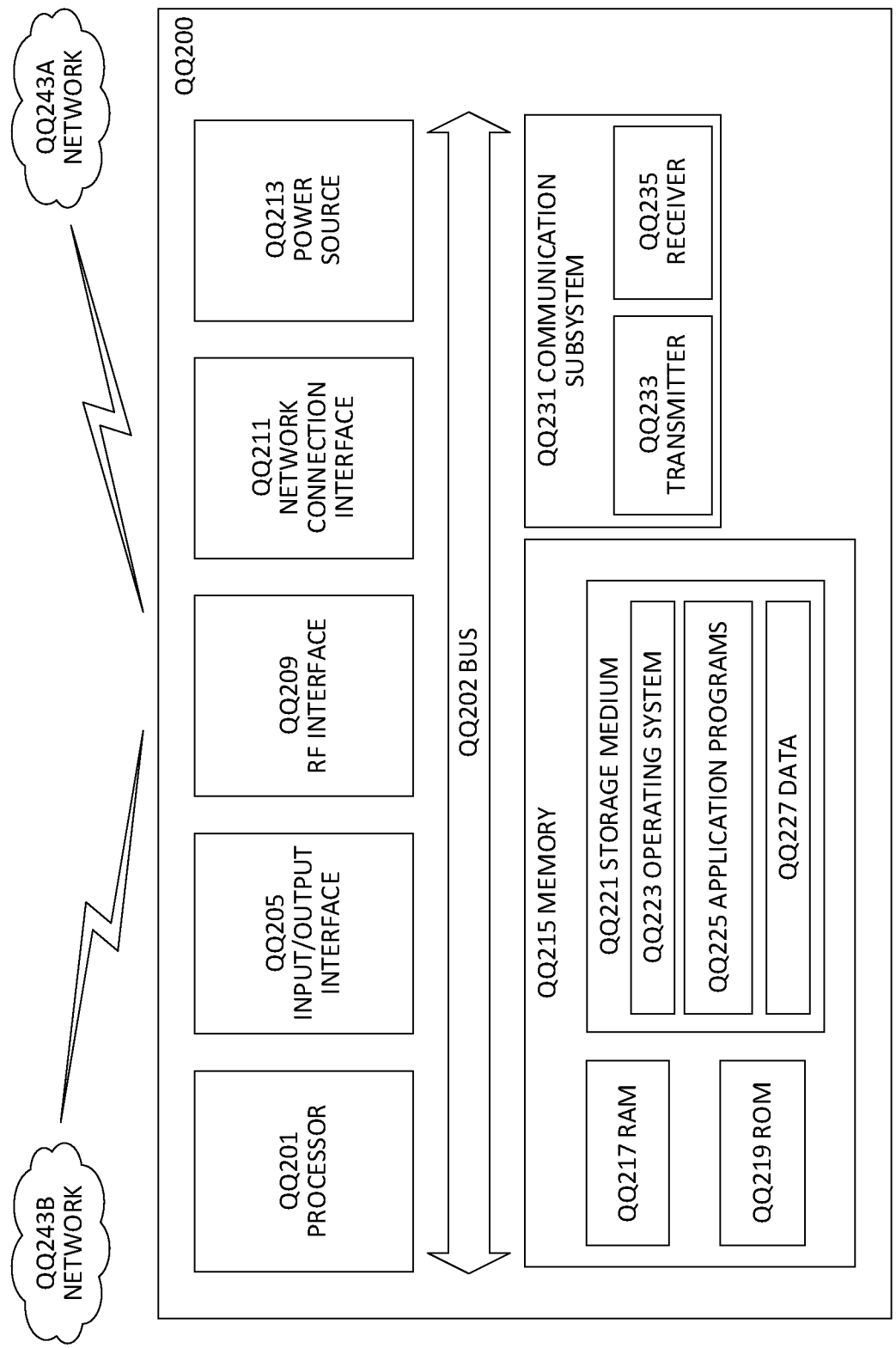
FIG. 15 is a block diagram of a user equipment according to some embodiments.

FIG. 15 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the $3^{rd}$ Generation Partnership Project (3GPP), including a NB-IoT UE, a machine type communication (MTC) UE, and/or an enhanced MTC (eMTC) UE. UE QQ200, as illustrated in FIG. 15, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 15 is a UE, the components discussed herein are equally applicable to a WD, and vice-versa.

In FIG. 15, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD- DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 15, processing circuitry QQ201 may be configured to communicate with network QQ243$b$ using communication subsystem QQ231. Network QQ243$a$ and network QQ243$b$ may be the same network or networks or different network or networks. Communication subsystem QQ231 may be configured to include one or more transceivers used to communicate with network QQ243$b$. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243$b$ may encompass wired and/or wireless networks such as a local-area network (LAN), a wide-area network (WAN), a computer network, a wireless network, a telecommunications network, another like network or any combination thereof. For example, network QQ243$b$ may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 16:
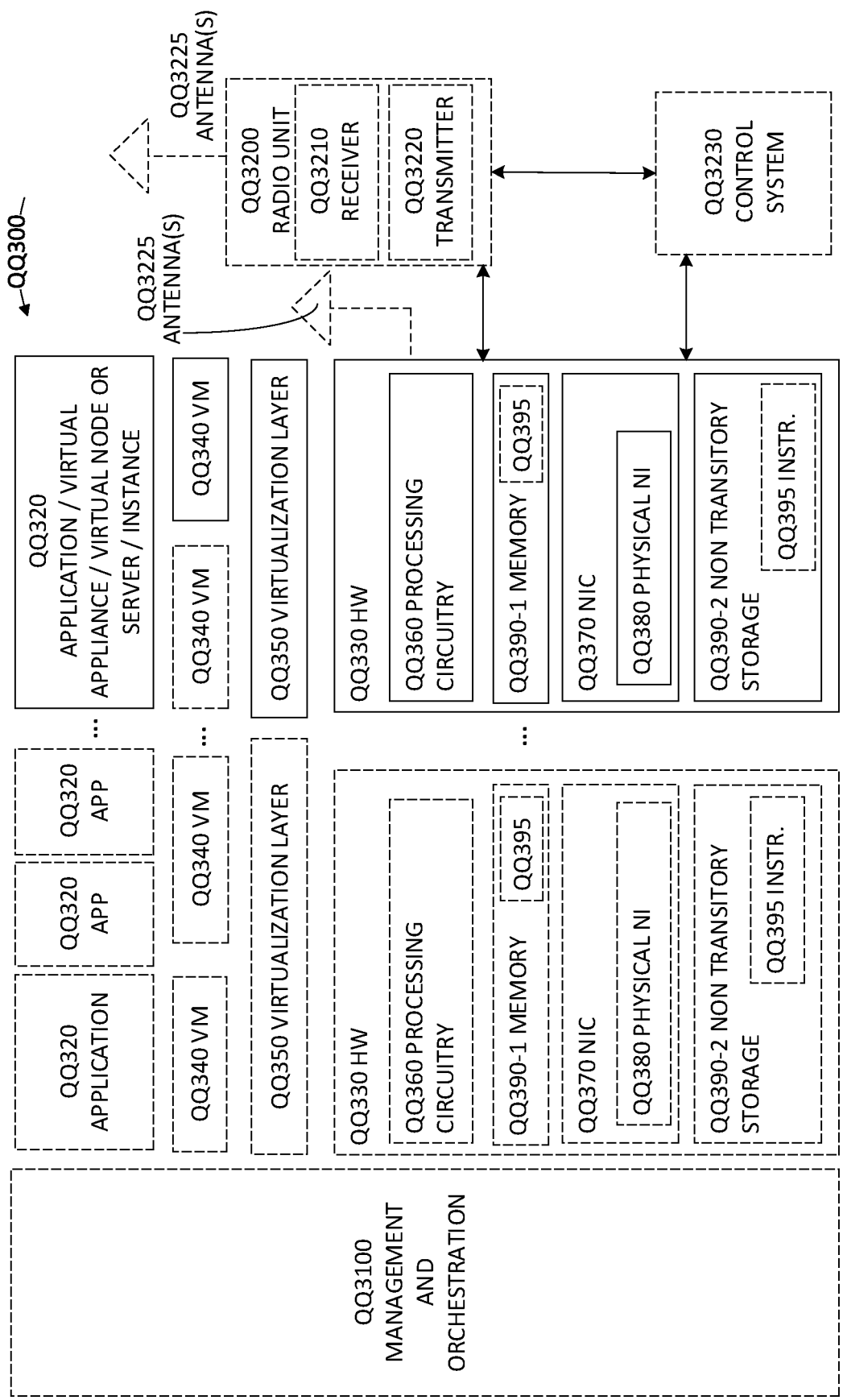
FIG. 16 is a block diagram of a virtualization environment according to some embodiments.

FIG. 16 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 16, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 16.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 17:
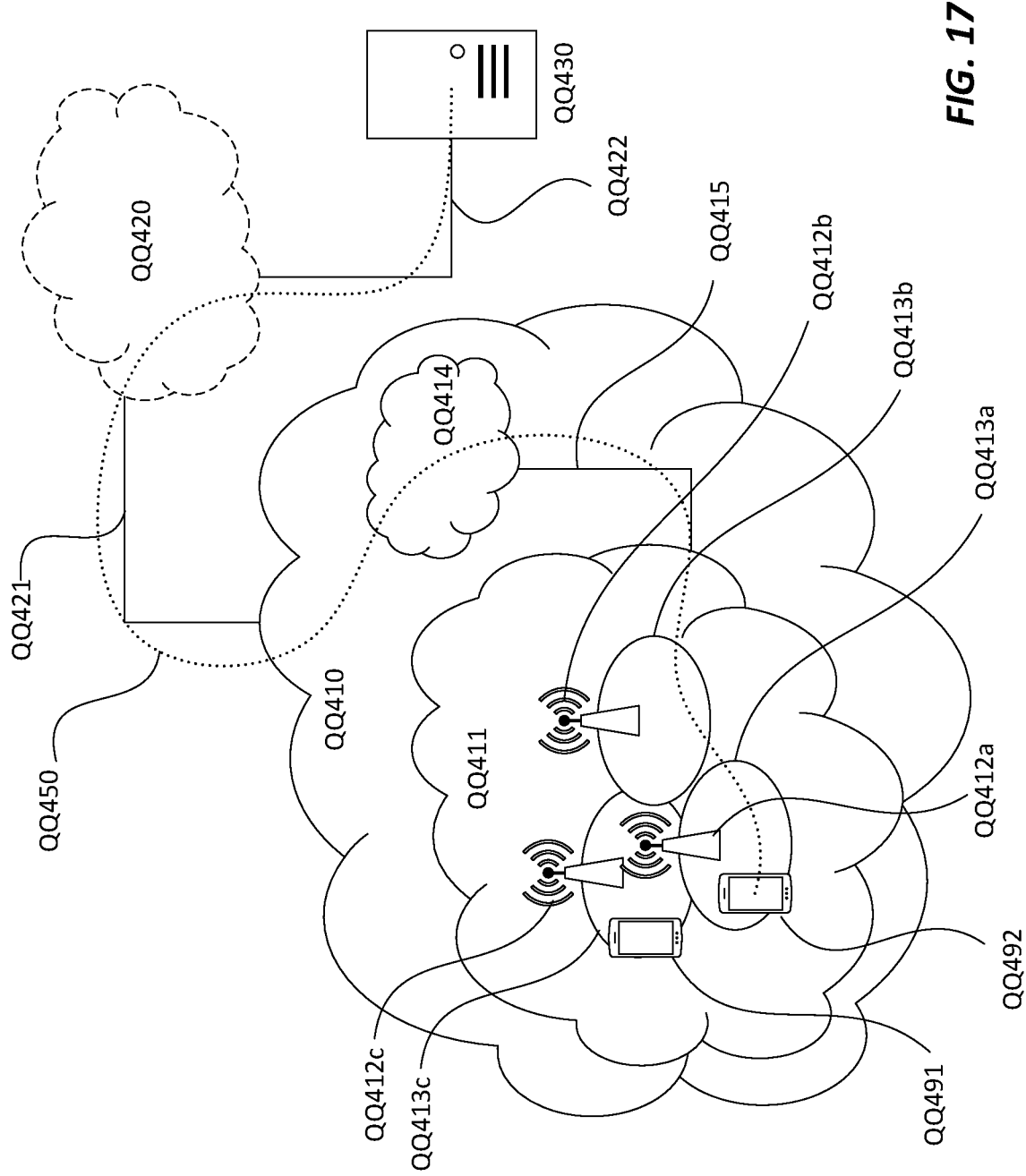
FIG. 17 is a block diagram of a communication network with a host computer according to some embodiments.

FIG. 17 illustrates a telecommunication network connected via an intermediate network to a host computer in accordance with some embodiments. In particular, with reference to FIG. 17, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 17 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 18:
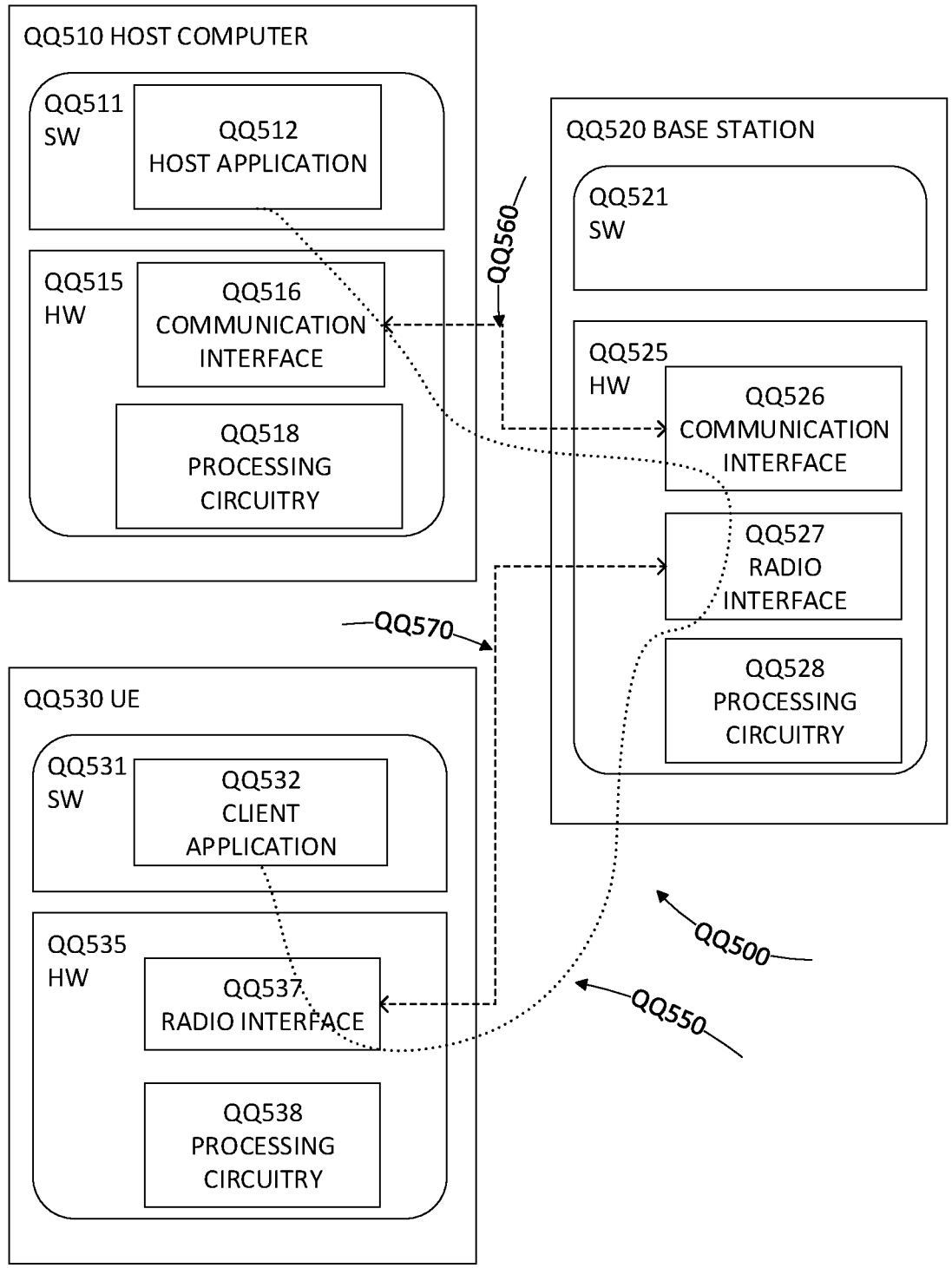
FIG. 18 is a block diagram of a host computer according to some embodiments.

Example implementations, in accordance with an embodiment, of the UE, base station and host computer discussed in the preceding paragraphs will now be described with reference to FIG. 18. FIG. 18 illustrates host computer communicating via a base station with a user equipment over a partially wireless connection in accordance with some embodiments In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 18) served by base station QQ520. Communication interface QQ526 may be configured to facilitate connection QQ560 to host computer QQ510. Connection QQ560 may be direct or it may pass through a core network (not shown in FIG. 18) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538.

Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 18 may be similar or identical to host computer QQ430, one of base stations QQ412a, QQ412b, QQ412c and one of UEs QQ491, QQ492 of FIG. 17, respectively. This is to say, the inner workings of these entities may be as shown in FIG. 18 and independently, the surrounding network topology may be that of FIG. 17.

In FIG. 18, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 19:
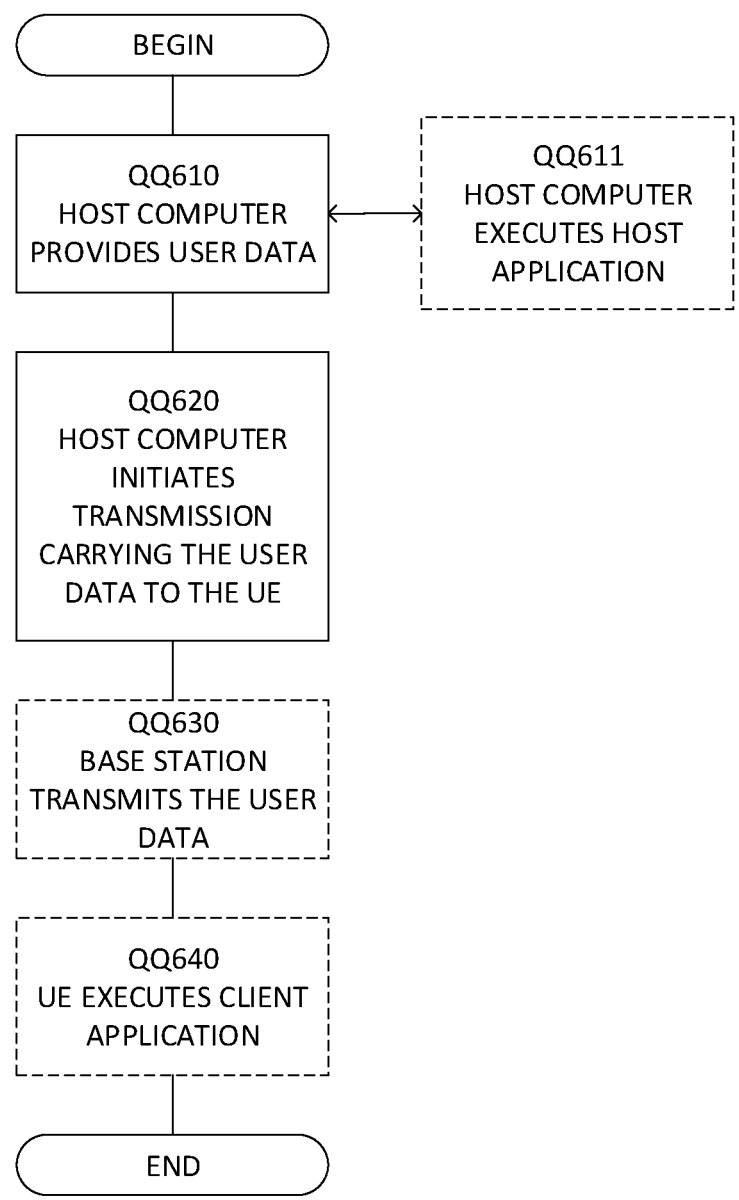
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 19 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 20:
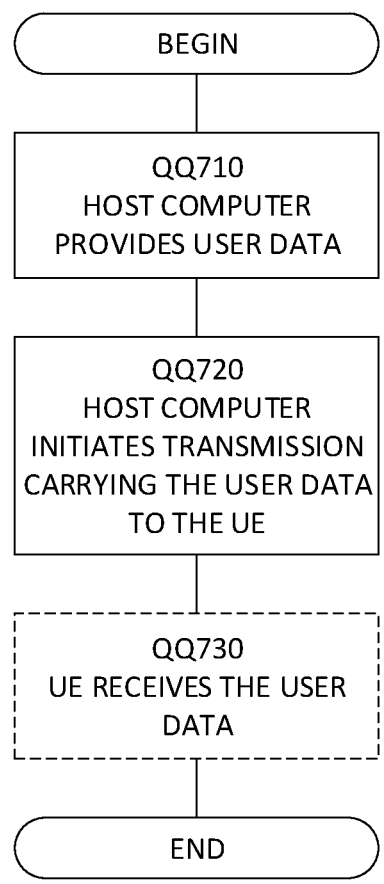
FIG. 20 is a flowchart illustrating a method implemented in a communication system, in accordance with one embodiment.

FIG. 20 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 20 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 21:
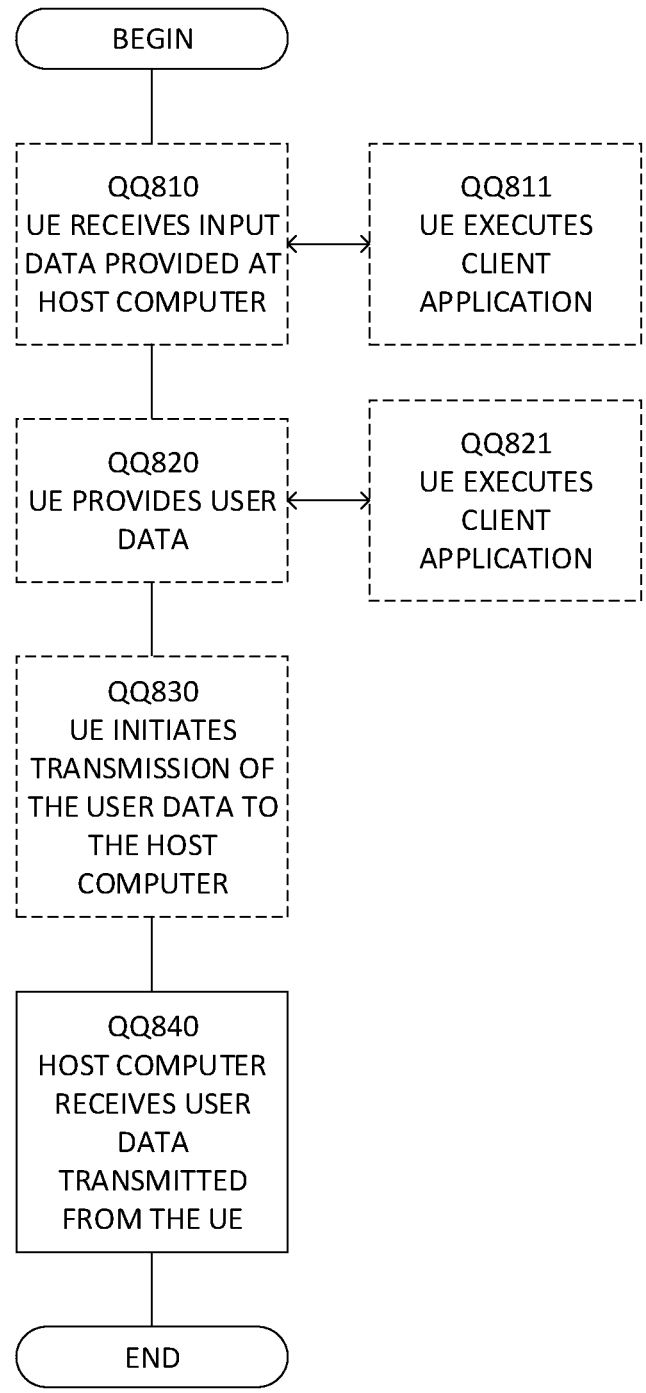
FIG. 21 is a flowchart illustrating a method implemented in a communication system, in accordance with one embodiment.

FIG. 21 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 21 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 22:
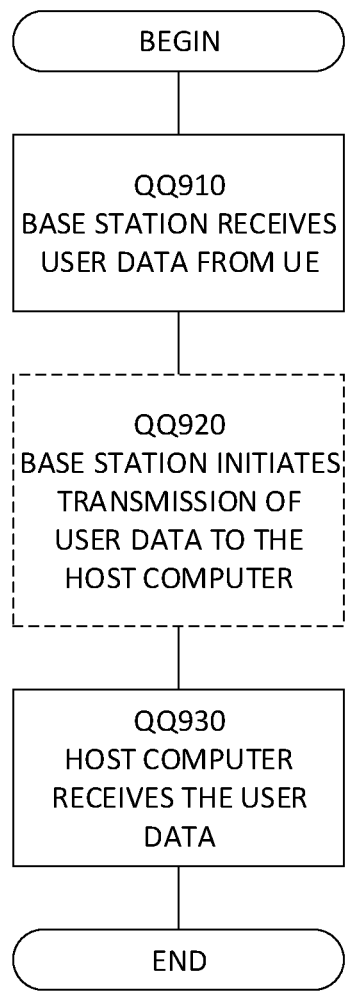
FIG. 22 is a flowchart illustrating a method implemented in a communication system, in accordance with one embodiment.

FIG. 22 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 22 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

EXAMPLE EMBODIMENTS

Embodiments described herein include, but are not limited to the examples enumerated below:

Group AAA Embodiments

AAA1. A method performed by a wireless device, the method comprising:
  receiving, at a physical layer of the wireless device, repetitions of a first channel transmission that are to be transmitted on first radio resources;
  receiving, at the physical layer, a second channel transmission that is to be transmitted on second radio resources that at least partly overlap in time with the first radio resources;
  dropping one or more repetitions of the first channel transmission that are to be transmitted on a portion of the first radio resources that overlap in time with the second radio resources;
  transmitting one or more repetitions of the first channel transmission that are to be transmitted on a different portion of the first radio resources that do not overlap in time with the second radio resources; and
  transmitting the second channel transmission on the second radio resources.

AAA2. The method of embodiment AAA1, wherein the second channel transmission has a higher priority than the first channel transmission.

AAA3. The method of any of embodiments AAA1-AAA2, wherein the first radio resources start earlier in time than the second radio resources.

AAA4. The method of any of embodiments AAA1-AAA3, wherein said dropping comprises dropping one or more repetitions of the first channel transmission that are to be transmitted in one or more time slots that overlap in time with one or more time slots in which the second channel transmission is to be transmitted.

AAA5. The method of any of embodiments AAA1-AAA4, wherein the first channel transmission is a first data channel.

AAA6. The method of embodiment AAA5, wherein the first data channel is a first Physical Uplink Shared Channel.

AAA6. The method of any of embodiments AAA1-AAA6, wherein the second channel transmission is a second data channel.

AAA7. The method of embodiment AAA6, wherein the second data channel is a second Physical Uplink Shared Channel.

AAA8. The method of any of embodiments AAA1-AAA4 and AAA6-AAA7, wherein the first channel transmission is a first control channel.

AAA9. The method of embodiment AAA8, wherein the first control channel is a first Physical Uplink Control Channel.

AAA10. The method of any of embodiments AAA1-AAA9, further comprising determining, at the physical layer, which of the first channel transmission and the second channel transmission has a higher priority.

AAA11. The method of any of embodiments AAA1-AAA10, wherein the first channel transmission is scheduled for transmission using a configured grant and/or the second channel transmission is scheduled for transmission using a configured grant.

AAA12. The method of any of embodiments AAA1-AAA11, wherein the repetitions of the first channel transmission are received at the physical layer before the physical layer receives the second channel transmission.

AAA13. The method of any of embodiments AAA1-AAA12, further comprising, at a MAC layer of the wireless device, constructing a MAC PDU of a specific set of one or more logical channels mapped to a configured grant, wherein the constructed MAC PDU conveys the second channel transmission, and transmitting the constructed MAC PDU to the physical layer.

AAA14. The method of embodiment AAA13, wherein the MAC PDU is transmitted to the physical layer without triggering a process to determine whether the configured grant is to be prioritized above another grant.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a wireless device, the method comprising:
    receiving a first grant that allocates first radio resources for use by the wireless device and a second grant that allocates second radio resources for use by the wireless device, wherein the first radio resources partially overlap in time with the second radio resources;
    splitting, at a Medium Access Control (MAC) layer of the wireless device, the first grant into a first non-overlapping grant and a first overlapping grant, wherein the first non-overlapping grant allocates a portion of the first radio resources which do not overlap in time with the second radio resources, and wherein the first overlapping grant allocates another portion of the first radio resources which overlap in time with the second radio resources
    generating a first non-overlapping MAC Protocol Data Unit (PDU) for transmission using the first non-overlapping grant;
    passing the first non-overlapping MAC PDU from the MAC layer to a physical layer of the wireless device for transmission using the first non-overlapping grant;
    generating a first overlapping MAC PDU and a second MAC PDU;
    selecting between passing the first overlapping MAC PDU from the MAC layer to the physical layer for transmission using the first overlapping grant or passing the second MAC PDU from the MAC layer to the physical layer for transmission using the second grant, based on respective priorities of the first overlapping grant and the second grant; and
    passing the first overlapping MAC PDU from the MAC layer to the physical layer for transmission using the first overlapping grant or passing the second MAC PDU from the MAC layer to the physical layer for transmission using the second grant, according to said selecting.

2. The method of claim 1, wherein said selecting is performed after a start of the first non-overlapping uplink grant but before a start of the first overlapping uplink grant.

3. The method of claim 1, wherein the first grant is a configured grant that periodically recurs, and wherein the second grant is a configured grant that periodically recurs.

4. The method of claim 1, wherein the first radio resources are associated with a first uplink data channel and the second radio resources are associated with a second uplink data channel.

5. The method of claim 1, wherein the first radio resources span a first duration in time, wherein the second radio resources span a second duration in time, wherein the first duration is longer than the second duration, wherein the first radio resources start earlier in time than the second radio resources, wherein the portion of the first radio resources allocated by the first non-overlapping grant occur earlier in time than the portion of the first radio resources allocated by the first overlapping grant, and wherein the first overlapping uplink grant is contiguous in time with the first non-overlapping uplink grant.

6. The method of claim 1, further comprising:
    determining whether to use or skip the first non-overlapping grant, based on whether the portion of the first radio resources allocated by the first non-overlapping grant span a duration less than a threshold; and/or determining whether to use or skip the first overlapping grant, based on whether the portion of the first radio resources allocated by the first overlapping grant span a duration less than a threshold.

7. A method performed by a radio network node, the method comprising:
splitting, at a Medium Access Control (MAC) layer of the radio network node, a first grant that allocates first radio resources for use by a wireless device into:
a first non-overlapping grant that allocates a portion of the first radio resources which do not overlap in time with second radio resources allocated by a second grant for use by the wireless device; and
a first overlapping grant that allocates another portion of the first radio resources which overlap in time with the second radio resources; and
receiving uplink transmission from the wireless device based on said splitting, including receiving:
a first non-overlapping MAC Protocol Data Unit (PDU) transmitted using the first non-overlapping grant; and
either a first overlapping MAC PDU transmitted using the first overlapping grant or a second MAC PDU transmitted using the second grant.

8. The method of claim 7, wherein the first grant is a configured grant that periodically recurs, and wherein the second grant is a configured grant that periodically recurs.

9. The method of claim 7, wherein the first radio resources are associated with a first uplink data channel and the second radio resources are associated with a second uplink data channel.

10. The method of claim 7, wherein the first radio resources span a first duration in time, wherein the second radio resources span a second duration in time, wherein the first duration is longer than the second duration, wherein the first radio resources start earlier in time than the second radio resources, wherein the portion of the first radio resources allocated by the first non-overlapping grant occur earlier in time than the portion of the first radio resources allocated by the first overlapping grant, and wherein the first overlapping uplink grant is contiguous in time with the first non-overlapping uplink grant.

11. The method of claim 7, further comprising transmitting the first grant to the wireless device, and wherein said splitting is performed after transmitting the first grant to the wireless device.

12. A wireless device comprising:
communication circuitry; and
processing circuitry configured to:
receive a first grant that allocates first radio resources for use by the wireless device and a second grant that allocates second radio resources for use by the wireless device, wherein the first radio resources partially overlap in time with the second radio resources;
split the first grant into a first non-overlapping grant and a first overlapping grant, wherein the first non-overlapping grant allocates a portion of the first radio resources which do not overlap in time with the second radio resources, and wherein the first overlapping grant allocates another portion of the first radio resources which overlap in time with the second radio resources
generate a first non-overlapping MAC Protocol Data Unit (PDU) for transmission using the first non-overlapping grant;
pass the first non-overlapping MAC PDU from the MAC layer to a physical layer of the wireless device for transmission using the first non-overlapping grant;
generate a first overlapping MAC PDU and a second MAC PDU;
select between passing the first overlapping MAC PDU from the MAC layer to the physical layer for transmission using the first overlapping grant or passing the second MAC PDU from the MAC layer to the physical layer for transmission using the second grant, based on respective priorities of the first overlapping grant and the second grant; and
pass the first overlapping MAC PDU from the MAC layer to the physical layer for transmission using the first overlapping grant or passing the second MAC PDU from the MAC layer to the physical layer for transmission using the second grant, according to said selection.

13. The wireless device of claim 12, wherein the processing circuitry is configured to select between performing the first overlapping uplink transmission using the first overlapping grant and performing the second uplink transmission using the second grant, after a start of the first non-overlapping uplink grant but before a start of the first overlapping uplink grant.

14. The wireless device of claim 12, wherein the first grant is a configured grant that periodically recurs, and wherein the second grant is a configured grant that periodically recurs.

15. The wireless device of claim 12, wherein the first radio resources are associated with a first uplink data channel and the second radio resources are associated with a second uplink data channel.

16. The wireless device of claim 12, wherein the first radio resources span a first duration in time, wherein the second radio resources span a second duration in time, wherein the first duration is longer than the second duration, wherein the first radio resources start earlier in time than the second radio resources, wherein the portion of the first radio resources allocated by the first non-overlapping grant occur earlier in time than the portion of the first radio resources allocated by the first overlapping grant, and wherein the first overlapping uplink grant is contiguous in time with the first non-overlapping uplink grant.

17. The wireless device of claim 12, the processing circuitry further configured to:
determine whether to use or skip the first non-overlapping grant, based on whether the portion of the first radio resources allocated by the first non-overlapping grant span a duration less than a threshold; and/or
determine whether to use or skip the first overlapping grant, based on whether the portion of the first radio resources allocated by the first overlapping grant span a duration less than a threshold.

18. The wireless device of claim 12, wherein the second grant has a higher priority than the first grant.

19. A radio network node comprising:
communication circuitry; and
processing circuitry configured to:
split, at a Medium Access Control (MAC) layer of the radio network node, a first grant that allocates first radio resources for use by a wireless device into:
a first non-overlapping grant that allocates a portion of the first radio resources which do not overlap in time with second radio resources allocated by a second grant for use by the wireless device; and a first overlapping grant that allocates another portion of the first radio resources which overlap in time with the second radio resources; and
   receive uplink transmission from the wireless device based on said splitting, including receiving:
      a first non-overlapping MAC Protocol Data Unit (PDU) transmitted using the first non-overlapping grant; and
      either a first overlapping MAC PDU transmitted using the first overlapping grant or a second MAC PDU transmitted using the second grant.

20. A wireless device comprising:
communication circuitry; and
processing circuitry configured to:
   receive, at a physical layer of the wireless device, repetitions of a first channel transmission that are to be transmitted on first radio resources;
   receive, at the physical layer, a second channel transmission that is to be transmitted on second radio resources that at least partly overlap in time with the first radio resources;
   drop one or more repetitions of the first channel transmission that are to be transmitted on a portion of the first radio resources that overlap in time with the second radio resources;
   transmit one or more repetitions of the first channel transmission that are to be transmitted on a different portion of the first radio resources that do not overlap in time with the second radio resources; and
   transmit the second channel transmission on the second radio resources.

* * * * *